US012605653B2

(12) United States Patent
Jessop et al.

(10) Patent No.: US 12,605,653 B2
(45) Date of Patent: Apr. 21, 2026

(54) ANIONIC SWITCHABLE HYDROPHILICITY SOLVENTS

(71) Applicant: QUEEN'S UNIVERSITY AT KINGSTON, Kingston (CA)

(72) Inventors: Philip G. Jessop, Camden East (CA); Meghan McKeeman, North Gower (CA); Igor Tadeu da Cunha, Kingston (CA); Maedeh Ramezani, Amherstview (CA); Alana Lloyd-Smith, Vanessa (CA)

(73) Assignee: Queen's University at Kingston, Kingston (CA)

( * ) Notice: Subject to any disclaimer, the term of this patent is extended or adjusted under 35 U.S.C. 154(b) by 294 days.

(21) Appl. No.: 18/179,719

(22) Filed: Mar. 7, 2023

(65) Prior Publication Data

US 2023/0356114 A1    Nov. 9, 2023

Related U.S. Application Data

(60) Provisional application No. 63/317,478, filed on Mar. 7, 2022.

(30) Foreign Application Priority Data

Mar. 18, 2022    (CA) ..................................... 3152656

(51) Int. Cl.
*C08J 11/08*        (2006.01)
*B01D 11/04*        (2006.01)
*B01D 19/04*        (2006.01)

(52) U.S. Cl.
CPC ...... *B01D 19/0413* (2013.01); *B01D 11/0492* (2013.01); *C08J 11/08* (2013.01); *C08J 2325/06* (2013.01)

(58) Field of Classification Search
CPC ............ B01D 19/0413; B01D 11/0492; B01D 11/028; B01D 11/0288; B01D 11/0488;
(Continued)

(56) References Cited

U.S. PATENT DOCUMENTS 7,980,494 B2    7/2011  Zapp
2011/0124745 A1 *  5/2011  Jessop ................ C11D 17/0017
                                                         405/128.7
(Continued)

FOREIGN PATENT DOCUMENTS

CA    2402451 A1 *  9/2001  ............... B09C 1/02
CA    2481202 C  * 11/2013  ............... C07F 9/54
(Continued)

OTHER PUBLICATIONS

Philip Jessop, "CO2-triggered switchable solvents, surfactants and other materials", Energy Environ. Sci, 2012, vol. 5, pp. 7240-7253. (Year: 2012).*

(Continued)

*Primary Examiner* — Joseph W Drodge
(74) *Attorney, Agent, or Firm* — Alston & Bird LLP

(57)    ABSTRACT

Anionic switchable hydrophilicity solvents (ASHS) that can be reversibly converted between hydrophobic and hydrophilic forms are described. The ASHS comprise a carboxylic acid, a water-soluble base, water, and addition and removal of an acidic gas ($CO_2$) effects the conversion between the hydrophobic and hydrophilic forms. A system and method for forming the ASHS are described, as well as applications utilizing the ASHS, including a method for separating a selected substance from a mixture, a method of removing gas from polymeric foam, and a method of extracting a hydrophobic material from a solid that is at least partially coated by the hydrophobic material.

20 Claims, 13 Drawing Sheets

(58) Field of Classification Search

CPC .... B01D 17/047; B01D 17/042; B01D 11/00; B01D 11/0292; C08J 11/08; C08J 2325/06; C07C 211/62; C07C 211/63; C07C 211/64; C07C 211/65; C07C 209/80; C07C 209/82; C07C 209/90

See application file for complete search history.

(56) References Cited

U.S. PATENT DOCUMENTS

| | | | | |
|---|---|---|---|---|
| 2011/0257334 A1* | 10/2011 | Jessop | | C10G 1/04 |
| | | | | 210/207 |
| 2013/0105377 A1* | 5/2013 | Jessop | | C02F 1/445 |
| | | | | 422/243 |
| 2013/0200291 A1* | 8/2013 | Jessop | | C09K 23/00 |
| | | | | 252/61 |
| 2014/0076810 A1* | 3/2014 | Jessop | | C08F 22/14 |
| | | | | 210/207 |
| 2019/0315637 A1* | 10/2019 | Jessop | | C02F 1/44 |

FOREIGN PATENT DOCUMENTS

| | | | | |
|---|---|---|---|---|
| CN | 103459439 A | * | 12/2013 | ......... B01D 61/0022 |
| WO | WO 2011/050469 A | | 5/2011 | |

OTHER PUBLICATIONS

English translation of CN_103459439_A, Dec. 18, 2013. (Year: 2013).*

Dazhen Xiong, Reversible Hydrophobic-Hydrophilic Transition of Ionic Liquids Driven by Carbon Dioxide, Angew. Chem. Int. Ed. 2015, vol. 54, pp. 7265-7269. (Year: 2015).*

Michael F. Cunningham, "Carbon Dioxide-Switchable Polymers: Where are the Future Opportunities?", Macromolecules, 2019, vol. 52, pp. 6801-6816. (Year: 2019).*

Alshamrani et al., "A guide to the selection of switchable functional groups for CO2-switchable compounds," Green Chemistry, 18:19276-19288, (2016).

Altshuller, "Review: Natural volatile organic substances and their effect on air quality in the United States," Atmospheric Environment, 1983(17):2131-2165, (1976).

Amann et al., "The revision of the air quality legislation in the European Union related to ground-level ozone," Journal of Hazardous Materials, 78:41-62, (2000).

Aria, Explosion of a VOC recovery pipeline at a petrochemical plant, 59, (2011).

Asare Bediako et al., "A switchable hydrophilicity solvent mediated process to prepare fine silica aerogel powder as an excellent flatting agent," Advanced Powder Technology, 30:565-571, (2019).

Bari et al., "Ambient volatile organic compounds (VOCs) in Calgary, Alberta: Sources and screening health risk assessment," Science of the Total Environment, 631-632:627-640, (2018).

Boyd et al., "Switchable hydrophilicity solvents for lipid extraction from microalgae for biofuel production," Bioresource Technology, 118:628-632, (2012).

Canadian Environmental Protection Act, Renewal of the Federal Agenda on the Reduction of Volatile Organic Compound (VOC) Emissions from Consumer and Commercial Products for the 2021 to 2028 period: discussion paper, https://www.canada.ca/en/environment-climate-change/services/canadian-environmental-protection-act-registry/federal-agenda-volatile-organic-compound-discussion-paper.html, 2021.

Capello et al., "What is a green solvent? A comprehensive framework for the environmental assessment of solvents," Green Chemistry, 9:927-934, (2007).

Ceschia et al., "Switchable anionic surfactants for the remediation of oil-contaminated sand by soil washing," RCS Advances, 4:4638-4645, (2014).

Chen et al., "A fatty acid solvent of switchable miscibility," Journal of Colloid and Interface Science, 504:645-651, (2017).

Chen et al., "China tackles the health effects of air pollution," The Lancet, 382:1959-1960, (2013).

Cicci et al., "Circular extraction: an innovative use of switchable solvents for the biomass biorefinery," Green Chemistry, 20:3908-3911, (2018).

Clark et al., "Alternative Solvents: Shades of Green," Organic Process Research & Development, 11:149-155, (2007).

Coates et al., Nature Reviews Materials, 5:501-516, (2020).

Cooper, "Recent Developments in Materials Synthesis and Processing Using Supercritical CO2** ," Advanced Materials, 13:1111-1114, (2001).

Council of the European Union and European Parliament, Directive 2004/42/CE of the European Parliament and of the Council of Apr. 21, 2004 on the limitation of emissions of volatile organic compounds due to the use of organic solvents in certain paints and varnishes and vehicle refinishing products and amending Directive 1999/13/EC, 143:87-96, (2004).

Courier Journal, 'I saw a flash—and the house shook like paper': The day Louisville's sewers exploded, 1981. Published online: Feb. 22, 2018, https://www.courier-journal.com/story/news/local/2018/02/22/kentucky-history-louisville-sewer-explosion-1981/364026002.

Cunha et al., "High pressure switchable water: an alternative method for separating organic products from water," Green Chemistry, 23:3996-4007, (2021).

Desimone, "Practical approaches to green solvents," Science, 297:799-803, (2002).

Diorazio et al., "Toward a More Holistic Framework for Solvent Selection," Organic Process Research & Development, 20:760-773, (2016).

Durelle et al., "Extending the range of switchable-hydrophilicity solvents," Physical Chemistry Chemical Physics, 17:5308-5313, (2015).

Finlayson-Pitts et al., "Tropospheric Air Pollution: Ozone, Airborne Toxics, Polycyclic Aromatic Hydrocarbons, and Particles," Science, 276:1045-1052, (1997).

Fu et al., "Extraction of phenols from lignin microwave-pyrolysis oil using a switchable hydrophilicity solvent," Bioresource Technology, 154:101-108, (2014).

Großeheilmann et al., "Switchable-Hydrophilicity Solvents for Product Isolation and Catalyst Recycling in Organocatalysis," ChemSusChem, 9:696-702, (2016).

Hamad et al., "Recycling of waste from polymer materials: An overview of the recent works," Polymer Degradation and Stability, 98:2801-2812, (2013).

Han et al., "Intensified recovery of switchable hydrophilicity solvents in flow," Green Chemistry, 23:2900-2906, (2021).

Heldebrant et al., "Liquid Poly(ethylene glycol) and Supercritical Carbon Dioxide: A Benign Biphasic Solvent System for Use and Recycling of Homogeneous Catalysts," Journal of the American Chemical Society, 125:5600-5601, (2003).

Heldebrant et al., "Liquid polymers as solvents for catalytic reductions," Green Chemistry, 8:807-815, (2006).

Hong et al., "Chemically recyclable polymers: a circular economy approach to sustainability," Green Chemistry, 19:3692-3706, (2017).

Huang et al., "Chlorinated volatile organic compounds (Cl-VOCs) in environment—sources, potential human health impacts, and current remediation technologies," Environment International, 71:118-138, (2014).

International Energy Agency, "Technology Roadmap: Energy and GHG Reductions in the Chemical Industry via Catalytic Processes," (2013).

Ismail et al., Innovative Infrastructure Solutions, 6:110, (2021).

Jessop et al., "A solvent having switchable hydrophilicity," Green Chemistry, 12:809-814, (2010).

Jessop et al., "Solvatochromic parameters for solvents of interest in green chemistry," Green Chemistry, 13:619-623, (2011).

Jessop, "Searching for green solvents," Green Chemistry, 13:1391-1398, (2011).

Kamal et al., "Catalytic oxidation of volatile organic compounds (VOCs)—A review," Atmospheric Environment, 140: 117-134, (2016).

(56)                References Cited

OTHER PUBLICATIONS

Kampa et al., "Human health effects of air pollution," Environmental Pollution, 151:362-367, (2008).
Kinnersley, "What really happened at Flixborough?," New Scientist Magazine, 65(938):520-522, (1975).
Krauklis et al., "Mechanism of Yellowing: Carbonyl Formation during Hygrothermal Aging in a Common Amine Epoxy," Polymers, 10:1017, (2018).
Lasarte-Aragonés et al., "Use of switchable hydrophilicity solvents for the homogeneous liquid-liquid microextraction of triazine herbicides from environmental water samples," J Sep Sci, 38:990-995, (2015).
Lei et al, Journal of Applied Polymer Science, 122:964-972, (2011).
Li et al., "Green chemistry for chemical synthesis," Proceedings of the National Academy of Sciences, 105:13197-13202, (2008).
Li et al., "Organic chemistry in water," Chemical Society Reviews, 35:68-82, (2006).
Lindstrom, Organic Reactions in Water: Principles, Strategies and Applications, Wiley, (2008) .
Lu et al., "Rapid Increases in Warm-Season Surface Ozone and Resulting Health Impact in China Since 2013," Environmental Science & Technology Letters, 5:487-494, (2018).
Minnesota Department of Health, Volatile Organic Compounds in Your Home, https://www.health.state.mn.us/communities/environment/air/toxins/voc.htm, 2021).
Paiva et al., ACS Sustainable Chemistry & Engineering, 2:1063-1071, (2014).
Phan et al., "Soybean oil extraction and separation using switchable or expanded solvents," Green Chemistry, 11:53-59, (2009).
Poliakoff et al., "Green Chemistry: Science and Politics of Change," Science, 297:807, (2002).
Reimann et al., Volatile Organic Compounds in the Atmosphere, ch2, pp. 33-81, (2007).
Rodhe, "A Comparison of the Contribution of Various Gases to the Greenhouse Effect," Science, 248: 1217, (1990).
Sahena et al., "Application of supercritical CO2 in lipid extraction—A Review," Journal of Food Engineering, 95:240-253, (2009).
Samori et al., "Application of switchable hydrophilicity solvents for recycling multilayer packaging materials," Green Chemistry, 19:1714-1720, (2017).

Sed et al., "A novel switchable-hydrophilicity, natural deep eutectic solvent (NaDES)-based system for bio-safe biorefinery," RSC Advances, 8:37092-37097, (2018).
Siyal et al., "Recycling of styrofoam waste: synthesis, characterization and application of novel phenyl thiosemicarbazone surface," Polish Journal of Chemical Technology, 14:11-18, (2013).
Smith et al., "Deep Eutectic Solvents (DESs) and Their Applications," Chemical Reviews, 114:11060-11082, (2014).
Su et al., "Preparing artificial latexes using a switchable hydrophilicity solvent," Green Chemistry, 19:1889-1894, (2017).
Tetko et al., "Application of Associative Neural Networks for Prediction of Lipophilicity in ALOGPS 2.1 Program," J. Chem. Inf. Comput. Sci., 42:1136-1145, (2002).
Tetko et al., "Virtual Computational Chemistry Laboratory—Design and Description," J. Comput. Aid. Mol. Des., 19:453-463, (2005).
US Environmental Protection Agency, Technical Overview of Volatile Organic Compounds, https://www.epa.gov/indoor-air-quality-iaq/technical-overview-volatile-organic-compounds, 2021).
US Environmental Protection Agency, Volatile Organic Compounds' Impact on Indoor Air Quality, https://www.epa.gov/indoor-air-quality-iaq/volatile-organic-compounds-impact-indoor-air-quality, 2021).
Vanderveen et al., "Design and evaluation of switchable-hydrophilicity solvents," Green Chemistry, 16:1187-1197, (2014).
Vanderveen et al., "Diamines as switchable-hydrophilicity solvents with improved phase behaviourt," RSC Advances, 8:27318-27325, (2018).
Yeoman et al., "Global emissions of VOCs for compressed aerosol products," Elementa: Science of Anthropocene, 9(1):00177, (2021).
Yook et al., "Efficient lipid extraction from the oleaginous yeast Yarrowia lipolytica using switchable solvents," Renewable Energy, 132:61-67, (2019).
Yue et al., "Higher Fatty Acid-Based CO2-Controllable Dual-Circulation Approach for Oil Recovery," Industrial & Engineering Chemistry Research, (2021).
Zhang et al., "Deep eutectic solvents: syntheses, properties and applications," Chemical Society Reviews, 41:7108-7146, (2012).

* cited by examiner

ANIONIC SWITCHABLE HYDROPHILICITY SOLVENTS

CROSS REFERENCE TO RELATED APPLICATIONS

This application claims benefit to U.S. Patent Application Ser. No. 63/317,478 filed on Mar. 7, 2022, and Canadian Patent Application No. 3,152,656 filed Mar. 18, 2022. U.S. Patent Application Ser. No. 63/317,478 and Canadian Patent Application No. 3,152,656 are incorporated herein by reference in their entirety.

FIELD OF THE INVENTION

The present invention pertains to solvents, specifically solvents that can be reversibly converted between hydrophobic and hydrophilic forms, and more specifically anionic switchable hydrophilicity solvents (ASHS).

BACKGROUND

A critical step to making industries more environmentally friendly and safer is replacing volatile organic solvents (VOS) with more environmentally friendly alternatives that mitigate the issues related to toxicity, flammability and energy consumption. Many VOS are used in industrial processes such as reactions, extractions, and separations.[1-5] However, the problems of VOS related to health, safety, and the environment[6-13] are driving the search for viable alternatives.[14, 15] The call for change is coming from environmental groups, researchers, industry, and even regulatory agencies that are creating strict regulations governing or even banning the use of certain solvents.[16-20] Some solvents are being banned in the US for specific applications, such as the use of hexane for the extraction of oils from seeds.[21] In addition, many VOS are highly flammable, making them a fire and explosion risk for workers and communities around factories.[22-25] Chlorinated organic solvents are an exception in terms of flammability, but they present high toxicity.[26] Aggravating the harm of VOS is the amount of energy required for distillation during solvent removal or recycling. Perversely, choosing a solvent that is less volatile in order to decrease flammability and inhalation risks (e.g. replacing hexane with heptane or higher alkanes) causes the energy required for distillation to increase. As a result, if we are to achieve a cleaner and more sustainable future, finding more environmentally friendly alternatives to VOS is essential.[14, 15, 27-32].

There are two primary classes of substitutes for volatile organic solvents: a) volatile inorganic solvents (e.g. water and supercritical $CO_2$), and b) nonvolatile organic solvents (e.g. ionic liquids, deep eutectic solvents, and liquid polymers).[33] Traditionally, water has been considered as a replacement for organic solvents.[31] However, there are issues associated with the range of organic reactions or processes that can occur in water,[34, 35] the utility of water as an extraction solvent for hydrophobic compounds, and the amount of energy required to remove water during separations or to clean up the water afterwards.[36] Supercritical $CO_2$ ($scCO_2$) is currently used in industry as a VOS substitute for a few important extractions such as caffeine from coffee beans but has not been widely adopted, perhaps because of the higher capital expenditures associated with high-pressure equipment.[31, 37-39]

Ionic liquids (ILs), deep eutectic solvents, and liquid polymers are all potential replacements for VOS, but are not easy to remove from products.[31, 40-44] Removing a nonvolatile product from a nonvolatile organic solvent can be nearly impossible without resorting to extraction with a VOS, which defeats the purpose of using a nonvolatile solvent in the first place.[31]

The ideal nonvolatile organic solvent would be easy to separate from the product without either distillation or the use of a VOS. To fill this need, switchable hydrophilicity solvents (SHS) were invented.[46-62] By definition, an SHS is a solvent that can switch back and forth between a hydrophilic state that is largely miscible with water and a hydrophobic state that forms a biphasic mixture with water. The original SHS, which are referred to herein as cationic SHS or CSHS, were amidines or tertiary amines. While normally hydrophobic and forming biphasic mixtures with water, the CSHS convert upon application of 1 bar of $CO_2$ to a hydrophilic, water-miscible bicarbonate salt (eq. 1). They return to their hydrophobic state if the $CO_2$ is removed, which can be done by bubbling a non-acidic gas (e.g. air, $N_2$ or Ar) into the liquid mixture and/or increasing the mixture temperature.

$$NR_{3(aq)}+CO_{2(g)}+H_2O_{(l)} \leftrightarrows [HNR_3^+][HCO_3^-]_{(aq)} \qquad (1)$$

By taking advantage of their switchable capabilities, SHS have many benefits compared to other VOS replacements. In their hydrophobic state, CSHS can solubilise hydrophobic solutes for the purposes of reactions or extractions and yet can be separated from those solutes without the use of distillation. This separation is achieved by extraction of the SHS from the solvent/solute mixture with carbonated water. The SHS can be easily recovered from the carbonated water if the $CO_2$ is flushed out of the solution, following which the SHS phase separates from the water. This entire process, including solvent use, removal, and recovery, does not require distillation, which is the key advantage of CSHS. By eliminating distillation, energy is saved. Because distillation is not required, a CSHS with a high boiling point and low flammability can be chosen, resulting in reduced risk to health, safety, and the environment. For example, N,N-dibutylethanolamine, a widely available CSHS, has a flashpoint of 95° C. and a boiling point of 230° C.[63] The simple strategy of $CO_2$-switching makes SHS viable and safer replacements for conventional flammable solvents.

Chen et al. and Yue et al. recently described SHS systems that combine a hydrophobic carboxylic acid with an amine. Because the component that forms the hydrophobic liquid phase is a carboxylic acid, and because it switches between a neutral and an anionic state (FIG. 1), this is referred to herein as an anionic SHS (ASHS).[68, 65] Sed et al. later reported that using a mixture of two acids, rather than a single acid, could lower the melting point of the SHS.[61]

There is a need for alternative solvents that can be reversibly converted between hydrophobic and hydrophilic forms.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

In one aspect, there is provided a system for forming an anionic switchable hydrophilicity solvent comprising: a carboxylic acid, wherein the carboxylic acid is a water-immiscible liquid in its neutral form, and is water-soluble in its anionic form, at one or more selected temperatures within a selected temperature range, and/or wherein the carboxylic acid is a liquid that is immiscible with water in its neutral form under an elevated pressure of $CO_2$, and is water-soluble in its anionic form, at one or more selected temperatures within a selected temperature range; a water-soluble base, wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof; water; and a source of $CO_2$; wherein when the carboxylic acid, the water-soluble base, and the water are combined at one of the one or more selected temperatures, the water-soluble base deprotonates the carboxylic acid and converts the carboxylic acid to its anionic water-soluble form, forming an aqueous solution; and when the aqueous solution is contacted with $CO_2$ at one of the one or more selected temperatures, the anionic form of the carboxylic acid is protonated and a biphasic mixture is formed, the biphasic mixture comprising: an aqueous phase comprising water and the water-soluble base, and an organic phase comprising the carboxylic acid in its neutral form; wherein when the water-soluble base is an amine, the ratio of the water-soluble base to the carboxylic acid is substoichiometric.

In another aspect, there is provided an anionic SHS composition comprising: a carboxylic acid, wherein the carboxylic acid is a water-immiscible liquid in its neutral form, and is water-soluble in its anionic form, at one or more selected temperatures within a selected temperature range, and/or wherein the carboxylic acid is a liquid that is immiscible with water in its neutral form under an elevated pressure of $CO_2$, and is water-soluble in its anionic form, at one or more selected temperatures within a selected temperature range; a water-soluble base, wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof; water; and dissolved $CO_2$; wherein when a temperature of the composition is one of the one or more selected temperatures, and when an amount of the dissolved $CO_2$ is sufficient to maintain the carboxylic acid in its neutral form, the carboxylic acid reversibly interconverts from: (a) its anionic water-soluble form, wherein the anionic water-soluble form of the carboxylic acid forms an aqueous solution with the water-soluble base and the water, to (b) its water-immiscible neutral form, wherein the water-immiscible neutral form of the carboxylic acid forms a biphasic mixture with the water-soluble base and the water comprising: an aqueous phase comprising water and the water-soluble base, and an organic phase comprising the carboxylic acid in its neutral form; wherein when the water-soluble base is an amine, the ratio of the water-soluble base to the carboxylic acid is substoichiometric.

In another aspect, there is provided a method of forming an anionic switchable hydrophilicity solvent comprising: (a) (i) combining in any order: a carboxylic acid, wherein the carboxylic acid is a water-immiscible liquid in its neutral form, and is water-soluble in its anionic form, at one or more selected temperatures within a selected temperature range, and/or wherein the carboxylic acid is a liquid that is immiscible with water in its neutral form under an elevated pressure of $CO_2$, and is water-soluble in its anionic form, at one or more selected temperatures within a selected temperature range; a water-soluble base, wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof; and water; wherein the water-soluble base deprotonates the carboxylic acid and converts the carboxylic acid to its anionic water-soluble form to form an aqueous solution, wherein a temperature of the aqueous solution is one of the one or more selected temperatures within the selected temperature range; wherein when the water-soluble base is an amine, the ratio of the water-soluble base to the carboxylic acid is substoichiometric; or (a) (ii) combining: a salt of a carboxylic acid and a water-soluble base, wherein the carboxylic acid is a water-immiscible liquid in its neutral form, and is water-soluble in its anionic form, at one or more selected temperatures within a selected temperature range, and/or the carboxylic acid is a liquid that is immiscible with water in its neutral form under an elevated pressure of $CO_2$, and is water-soluble in its anionic form, at one or more selected temperatures within a selected temperature range; and wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof; and water; to form an aqueous solution, wherein a temperature of the aqueous solution is one of the one or more selected temperatures within the selected temperature range; wherein when the water-soluble base is an amine, the ratio of the water-soluble base to the carboxylic acid is substoichiometric; (b) contacting the aqueous solution with $CO_2$ to protonate the anionic form of the carboxylic acid to form a biphasic mixture, wherein a temperature of the biphasic mixture is one of the one or more selected temperatures within the selected temperature range, the biphasic mixture comprising: an aqueous phase comprising water and the water-soluble base, and an organic phase comprising the carboxylic acid in its neutral form; (c) optionally, removing $CO_2$ from the biphasic mixture, wherein when $CO_2$ is removed from the biphasic mixture the carboxylic acid is deprotonated and converts to its anionic water-soluble form, re-forming the aqueous solution.

In still another aspect, there is provided a method for separating a selected substance from a mixture using an anionic switchable hydrophilicity solvent, comprising: (a) adding a carboxylic acid in its neutral form that is in a liquid state to a mixture comprising a selected substance that is water-immiscible or water-insoluble, wherein the carboxylic acid is a water-immiscible liquid in its neutral form, and is water-soluble in its anionic form, at one or more selected temperatures within a selected temperature range, and/or wherein the carboxylic acid is a liquid that is immiscible with water in its neutral form under an elevated pressure of $CO_2$, and is water-soluble in its anionic form, at one or more selected temperatures within a selected temperature range; (b) allowing the carboxylic acid to solubilize the selected substance to form a second mixture; (c) optionally isolating insoluble material from the second mixture; (d) contacting the second mixture with water and a water-soluble base, wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof, wherein the water-soluble base deprotonates the carboxylic acid and converts the carboxylic acid to its anionic water-soluble form to form a two-phase mixture having: a first hydrophobic phase comprising the selected substance, and a second aqueous phase comprising the carboxylic acid in its anionic water-soluble form, wherein a temperature of the two-phase mixture is one of the one or more selected temperatures within the selected temperature range, wherein when the water-soluble base is an amine, the ratio of the water-soluble base to the carboxylic acid is substoichiometric; and (e) separating the first hydrophobic phase from the second aqueous phase; (f) contacting the second aqueous phase with CO$_2$ to protonate the anionic form of the carboxylic acid to form a biphasic mixture, wherein a temperature of the biphasic mixture is one of the one or more selected temperatures within the selected temperature range, the biphasic mixture comprising: an aqueous phase comprising water and the water-soluble base, and an organic phase comprising the carboxylic acid in its neutral form; and (g) separating the organic phase from the aqueous phase to recover the carboxylic acid; wherein the selected substance is not reactive with the carboxylic acid, the water-soluble base, or a combination thereof.

In still yet another aspect, there is provided a method of removing gas from polymeric foam using an anionic switchable hydrophilicity solvent, comprising: (a) contacting a polymeric foam with a carboxylic acid in its neutral form that is in a liquid state, wherein the carboxylic acid is a water-immiscible liquid in its neutral form, and is water-soluble in its anionic form, at one or more selected temperatures within a selected temperature range, and/or wherein the carboxylic acid is a liquid that is immiscible with water in its neutral form under an elevated pressure of CO$_2$, and is water-soluble in its anionic form, at one or more selected temperatures within a selected temperature range; (b) allowing the carboxylic acid to solubilize the polymeric foam to form a solution; (c) contacting the solution of (b) with water and a water-soluble base, wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof, wherein the water-soluble base deprotonates the carboxylic acid and converts the carboxylic acid to its anionic water-soluble form to form a two-phase mixture having: a first solid phase comprising the polymer, and a second aqueous phase comprising the carboxylic acid in its anionic water-soluble form, wherein a temperature of the two-phase mixture is one of the one or more selected temperatures within the selected temperature range, wherein when the water-soluble base is an amine, the ratio of the water-soluble base to the carboxylic acid is substoichiometric; and (d) separating the first solid phase from the second aqueous phase; (e) contacting the second aqueous phase with CO$_2$ to protonate the anionic form of the carboxylic acid to form a biphasic mixture, wherein a temperature of the biphasic mixture is one of the one or more selected temperatures within the selected temperature range, the biphasic mixture comprising: an aqueous phase comprising water and the water-soluble base, and an organic phase comprising the carboxylic acid in its neutral form; and (f) separating the organic phase from the aqueous phase to recover the carboxylic acid. In one embodiment, in step (c), the solution of (b) is first contacted with water and then the combination of the solution of (b) and water is subsequently contacted with the water-soluble base.

In still yet another aspect, there is provided a method of extracting a hydrophobic material from a solid that is at least partially coated by the hydrophobic material using an anionic switchable hydrophilicity solvent, comprising: (a) combining the solid that is at least partially coated by a hydrophobic material with a carboxylic acid in its neutral form that is in a liquid state, wherein the carboxylic acid is a water-immiscible liquid in its neutral form, and is water-soluble in its anionic form, at one or more selected temperatures within a selected temperature range, and/or wherein the carboxylic acid is a liquid that is immiscible with water in its neutral form under an elevated pressure of CO$_2$, and is water-soluble in its anionic form, at one or more selected temperatures within a selected temperature range, to form a mixture of the solid in a homogeneous single-phase liquid, said single-phase liquid comprising the carboxylic acid in its neutral form and the hydrophobic material; (b) separating the solid from the single-phase liquid; (c) contacting the single-phase liquid with water and a water-soluble base, wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof, wherein the water-soluble base deprotonates the carboxylic acid and converts the carboxylic acid to its anionic water-soluble form to form a two-phase mixture having: a first hydrophobic phase comprising the hydrophobic material, and a second aqueous phase comprising the carboxylic acid in its anionic water-soluble form, wherein a temperature of the two-phase mixture is one of the one or more selected temperatures within the selected temperature range, wherein when the water-soluble base is an amine, the ratio of the water-soluble base to the carboxylic acid is substoichiometric; and (d) separating the first hydrophobic phase from the second aqueous phase; (e) contacting the second aqueous phase with CO$_2$ to protonate the anionic form of the carboxylic acid to form a biphasic mixture, wherein a temperature of the biphasic mixture is one of the one or more selected temperatures within the selected temperature range, the biphasic mixture comprising: an aqueous phase comprising water and the water-soluble base, and an organic phase comprising the carboxylic acid in its neutral form; and (f) separating the organic phase from the aqueous phase to recover the carboxylic acid; wherein the hydrophobic material is not reactive with the carboxylic acid, the water-soluble base, or a combination thereof.

BRIEF DESCRIPTION OF THE FIGURES

For a better understanding of the present invention including the progression of development to get to the end product, reference is made to the following description which is to be used in conjunction with the accompanying drawings, where.

7 formed ($[BH^+][A^-]$). The addition of $CO_2$ re-protonates the carboxylic acid, which separates from the aqueous phase into a second organic liquid phase. The cation is shown here as $BH^+$ but could instead be $Na^+$ or any other cation that would make the carboxylate salt water soluble.

Figure 1:
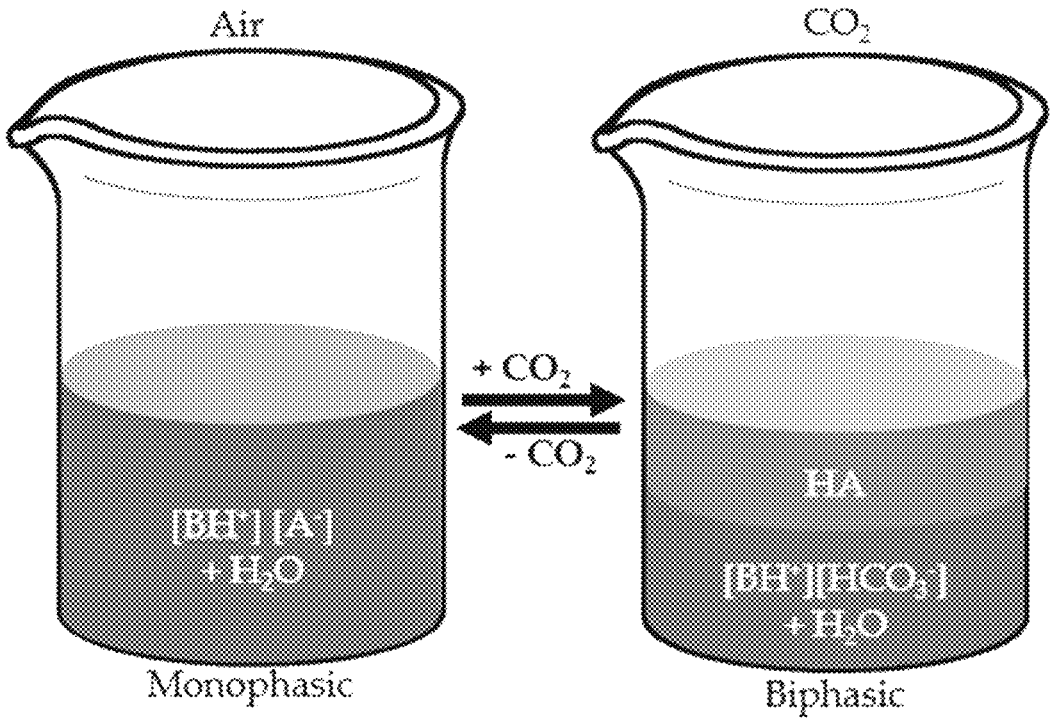
FIG. 1 illustrates the behaviour of a CO$_2$-switchable anionic SHS (ASHS) containing a hydrophobic carboxylic acid and a water-soluble base. When the carboxylic acid (HA) is mixed with the aqueous solution, the acid gets deprotonated by the base (B), and a water-soluble salt is
Figure 2:
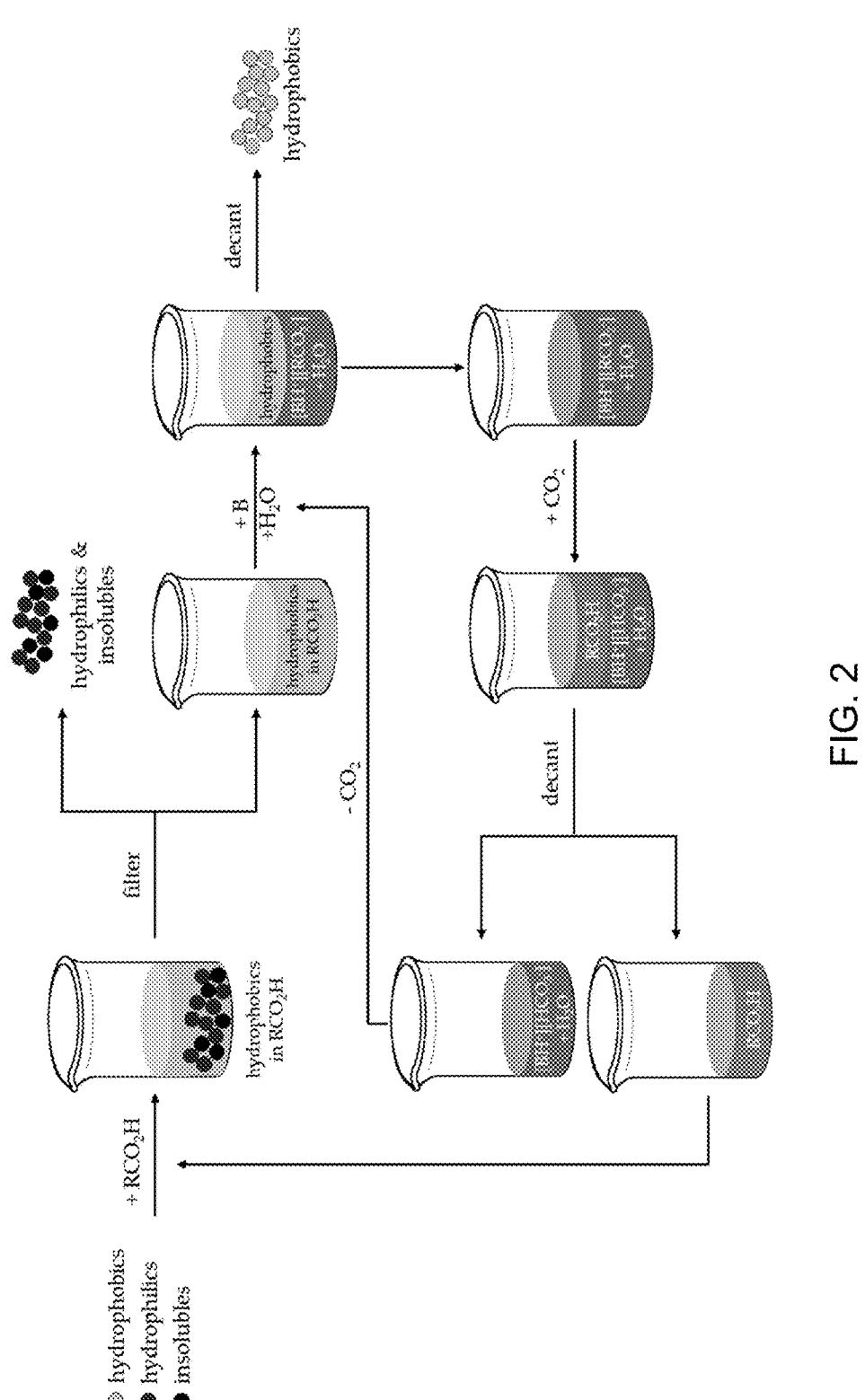

FIG. 2 illustrates the process by which a $CO_2$-switchable anionic SHS (ASHS) containing a hydrophobic carboxylic acid can be used to separate hydrophobic components from a mixture also containing hydrophilic and insoluble components. When the carboxylic acid ($RCO_2H$) is added to the mixture, the hydrophobic components are dissolved, leaving behind the hydrophilics and insoluble components that can be filtered off. To the solution of hydrophobic compounds in $RCO_2H$, an aqueous base solution can be added. The acid gets deprotonated by the base (B), and a water-soluble salt is formed with it ($[BH^+][RCO_2^-]$). The hydrophobics and other insoluble components create a separate liquid or solid phase that can be removed by decantation or filtration. The addition of $CO_2$ to the aqueous phase re-protonates the carboxylic acid, which separates from the aqueous phase and forms an organic liquid phase. The reprotonated carboxylic acid can be reused for another separation. After $CO_2$ is removed from the aqueous solution, both the $CO_2$ and the aqueous base can also be reused for another cycle.

Figure 3:
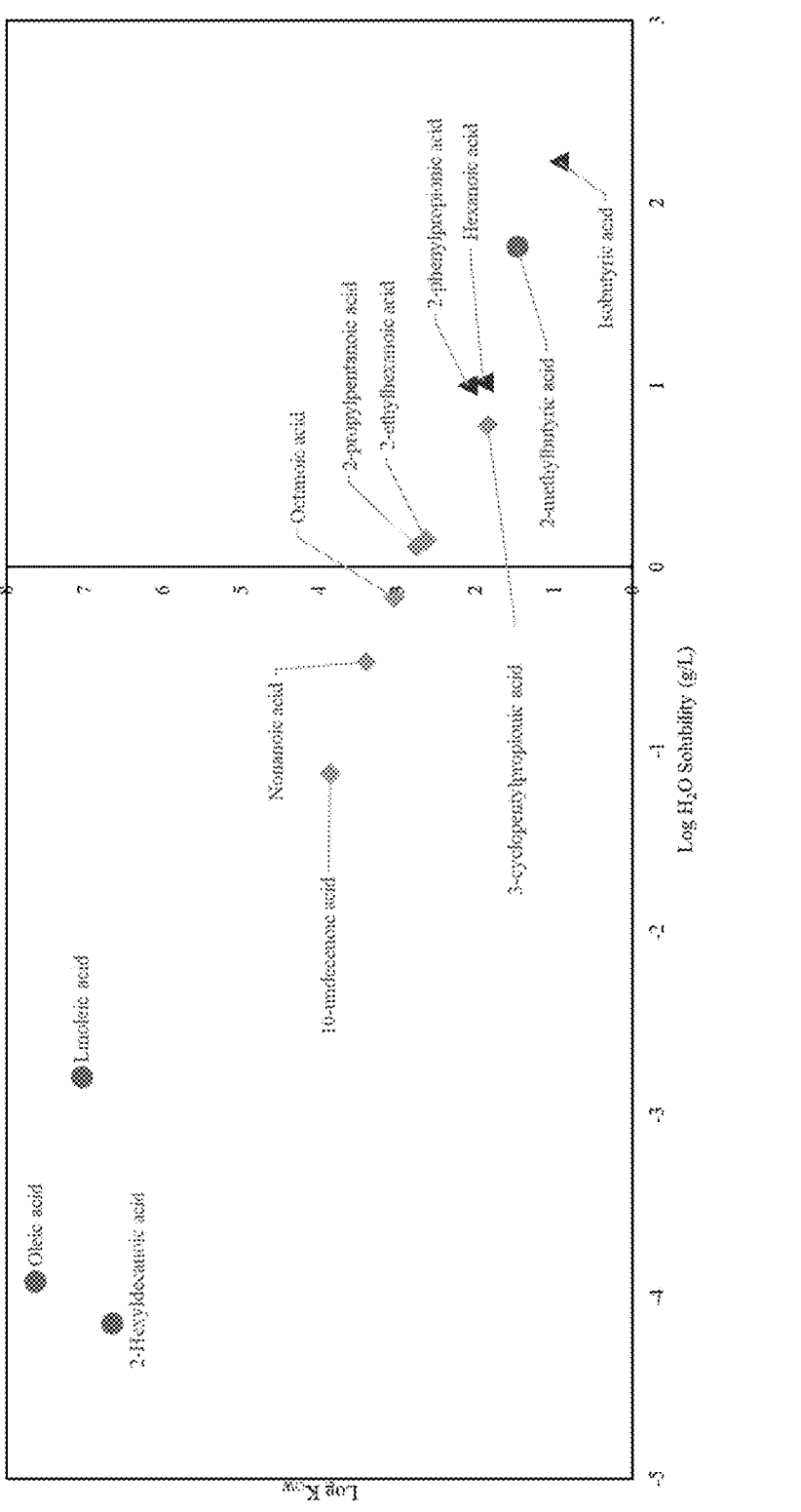

FIG. 3 is a chart illustrating the success or failure of tested carboxylic acids as ASHS when paired with NaOH (varying molar ratio depending on the carboxylic acid, see Table 4), compared to the log $K_{ow}$ (from published safety data sheets or predicted with ChemDraw) and the solubility of each acid in water. Hydrophobicity increases up and to the left. Carboxylic acids that function as ASHS, which means that they are monophasic under air and biphasic under $CO_2$, are denoted by the diamonds (♦). The triangles (▲) represent the carboxylic acids that remained monophasic after the addition of 1 bar of $CO_2$ to the system. Carboxylic acids that were not miscible with the basic aqueous solution are denoted by circles (●).

Figure 4:
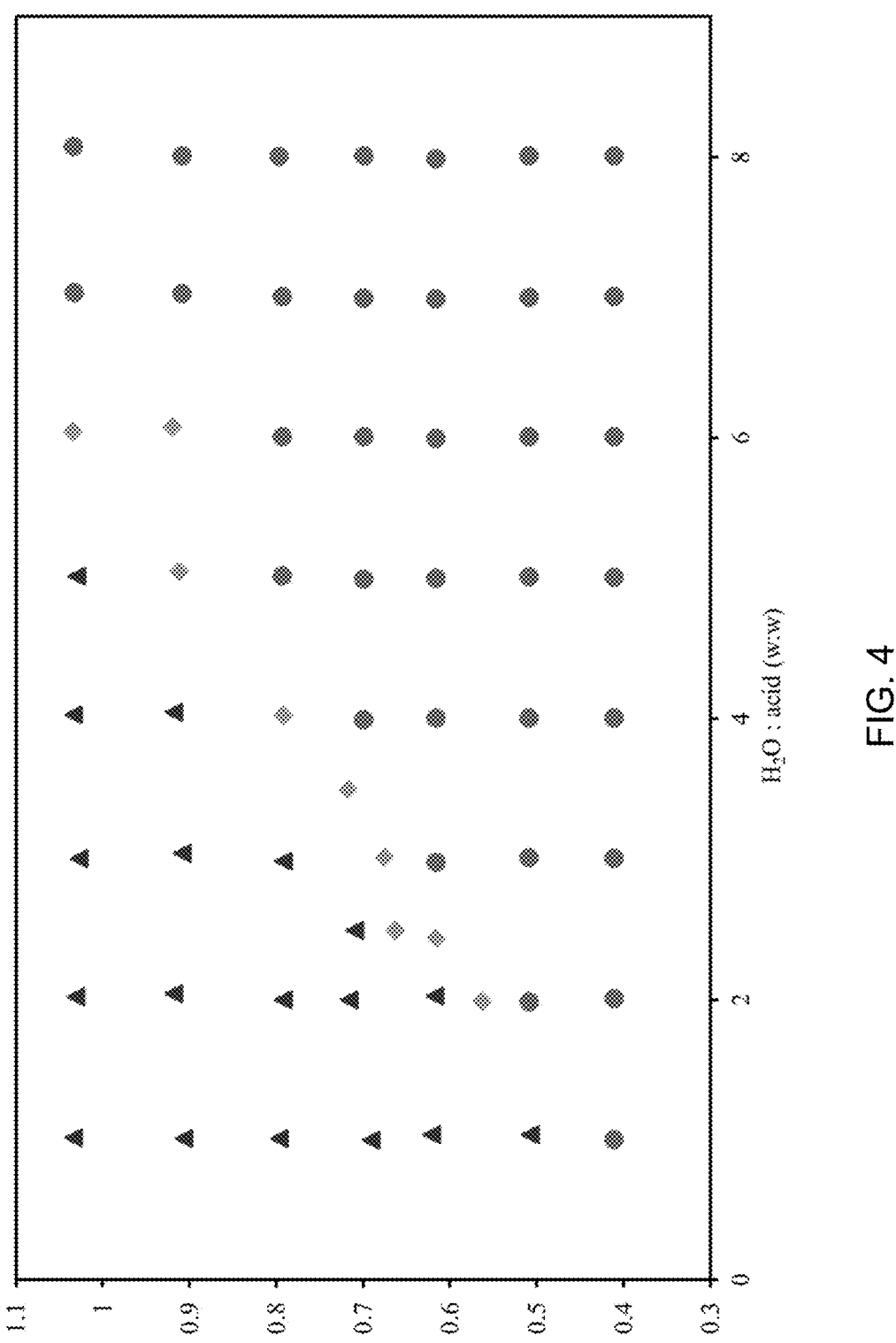

FIG. 4 is a chart illustrating ASHS behaviour for 2-ethylhexanoic acid (EHA)/NaOH/water mixtures with base:acid mole ratios and water:acid mass ratios. The dots ● denote compositions that were biphasic under air. The diamonds ♦ denote compositions exhibiting switchable behaviour (monophasic under air and biphasic under 1 bar of $CO_2$). The triangles ▲ represent compositions that remained monophasic when 1 bar of $CO_2$ was added.

Figure 5:
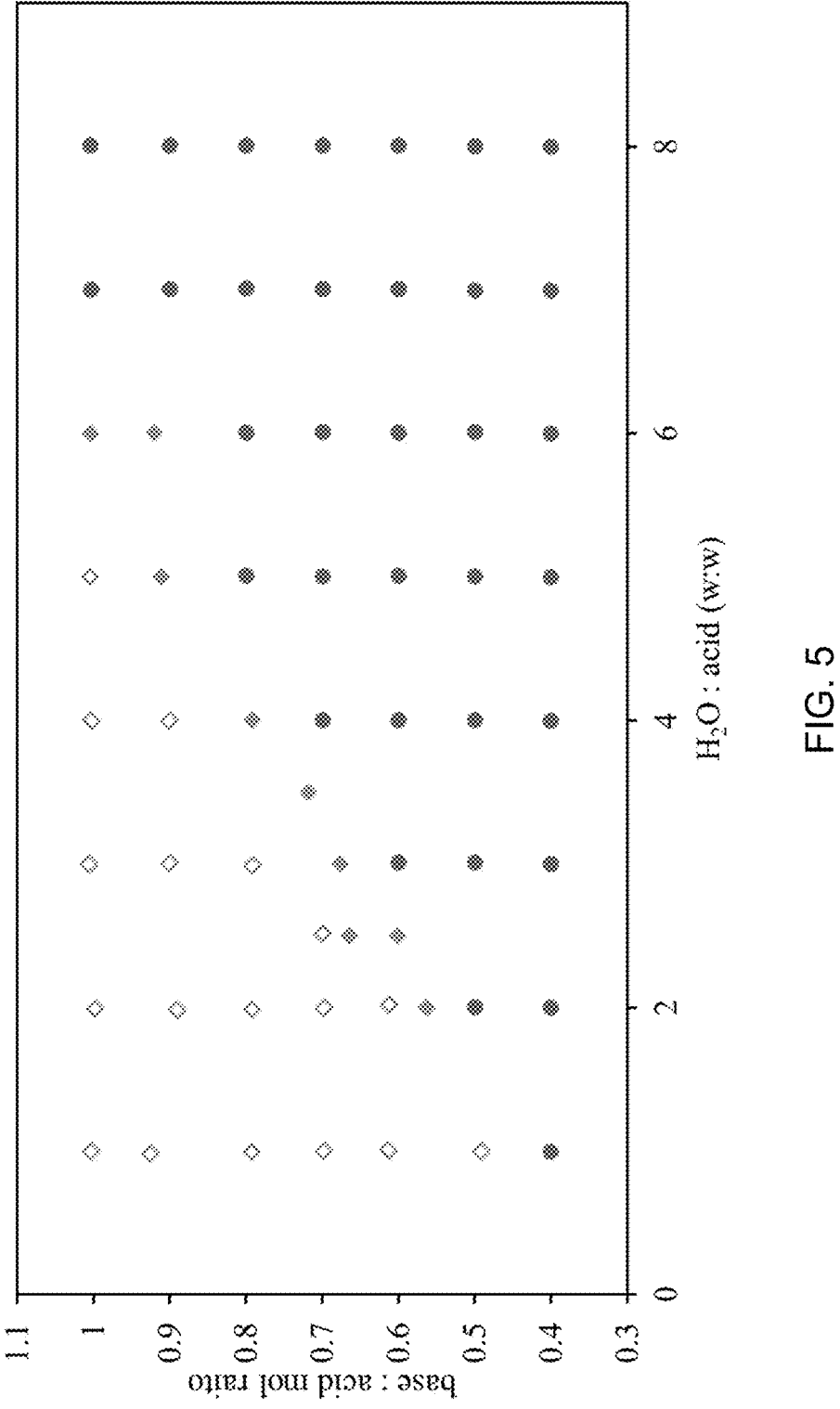

FIG. 5 is a chart illustrating ASHS behaviour for EHA/NaOH/water mixtures with varying base:acid mole ratios and water:acid mass ratios when submitted to 10 bar of $CO_2$. The hollow diamonds ◇ designate compositions that switched from monophasic to biphasic when 10 bar of $CO_2$ was applied, but not when 1 bar was applied. The compositions represented by filled diamonds ♦ switched from monophasic to biphasic when 1 bar of $CO_2$ was applied. The dots ● denote compositions that were biphasic under air.

Figure 6:
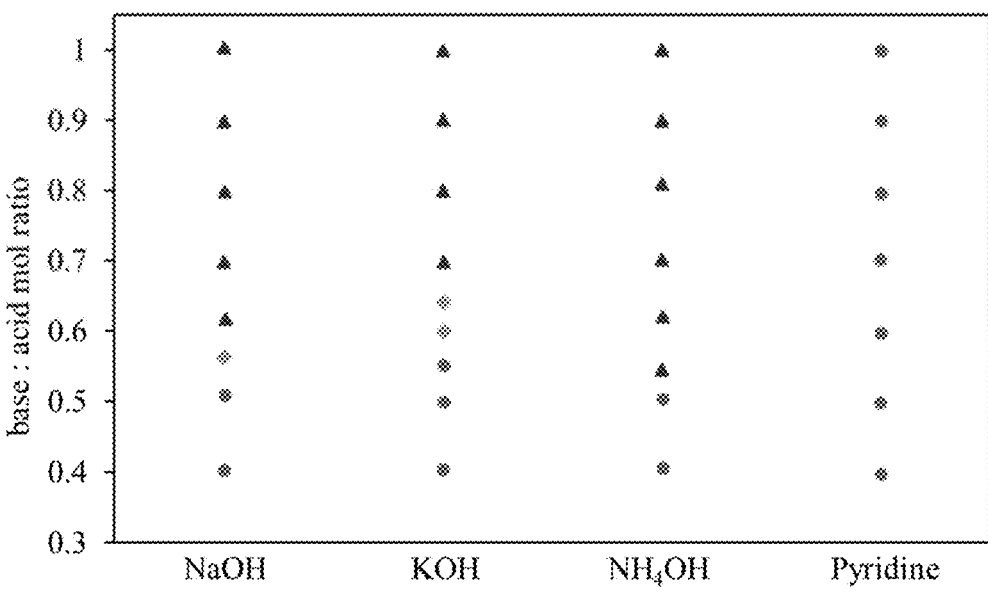

FIG. 6 is a chart illustrating ASHS behaviour for EHA/base/water mixtures with varying base:EHA ratio and 2:1 $H_2O$:EHA mass ratio, where base is either NaOH, KOH, $NH_4OH$ or pyridine. The dots ● denote compositions that were biphasic under air. The diamonds ♦ denote compositions that exhibited switchable behaviour (monophasic under air and biphasic under 1 bar of $CO_2$). The triangles ▲ represent compositions that remained monophasic upon addition of 1 bar of $CO_2$.

Figure 7:
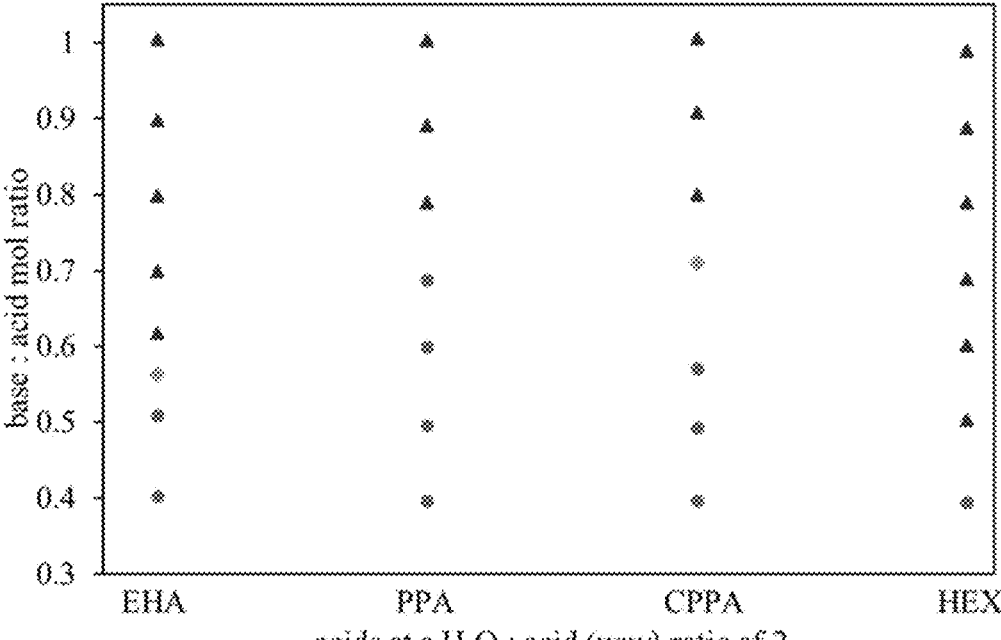

FIG. 7 is a chart illustrating ASHS behaviour for systems with varying NaOH:acid ratios and 2:1 $H_2O$:EHA mass ratio, where the carboxylic acid is either EHA, 2-propyl-pentanoic acid (PPA), 3-cyclopentylpropionic acid (CPPA) or hexanoic acid (HEX). The dots ● denote compositions that remained biphasic under air. The diamonds ♦ denote compositions that exhibited switchable behaviour (monophasic under air and biphasic under 1 bar of $CO_2$). The triangles ▲ represent compositions that remained monophasic upon addition of 1 bar of $CO_2$.

Figure 8:

FIG. 8 is a picture comparing the volume of 8 g of expanded polystyrene (EPS) foam (left) and the powder (right) obtained after the recycling treatment carried out using an ASHS composed of CPPA and NaOH.

Figure 9:
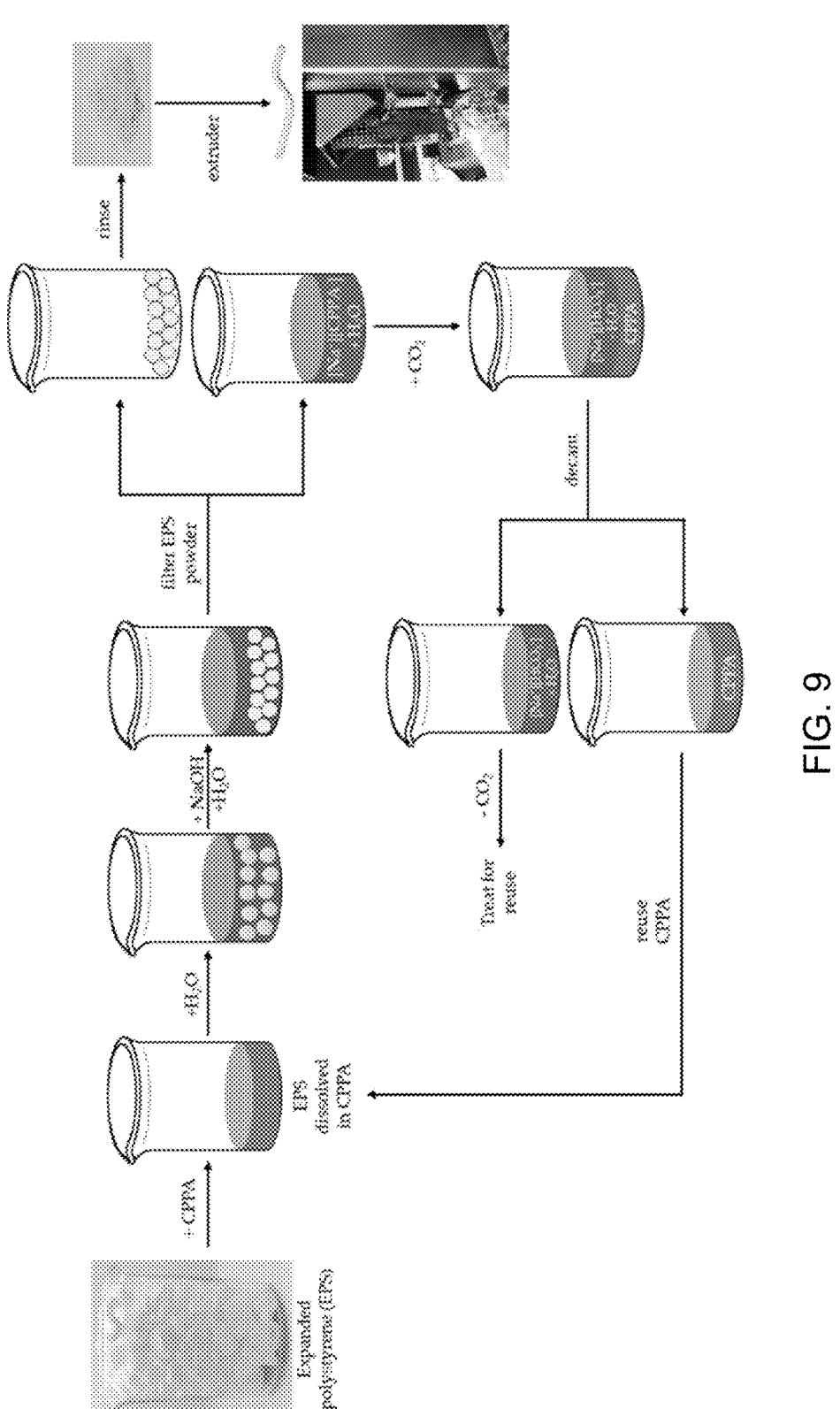

FIG. 9 illustrates the process for recycling EPS using an ASHS (in this case CPPA). The acid in its neutral form dissolves the EPS, releasing the air trapped therein. The addition of water into the mixture promotes the formation of ASHS-polymer droplets. To recover the smaller polymer particles, a basic aqueous solution (using NaOH as the base) is introduced to the system. The carboxylic acid is deprotonated and thereby becomes hydrophilic. It therefore partitions preferentially into the aqueous phase. This allows the polymer to precipitate as a dense powder which can be collected by filtration. The particles can be further purified by rinsing the powder with water and a basic solution of $NaHCO_3$ and water. To recover the ASHS used, $CO_2$ can be introduced to the aqueous washings, promoting the protonation of the CPPA which in its neutral form is largely immiscible with water, resulting in the formation of a separate organic phase than can be decanted. This allows for the reuse of the ASHS for the recycling of another batch of EPS.

Figure 10:
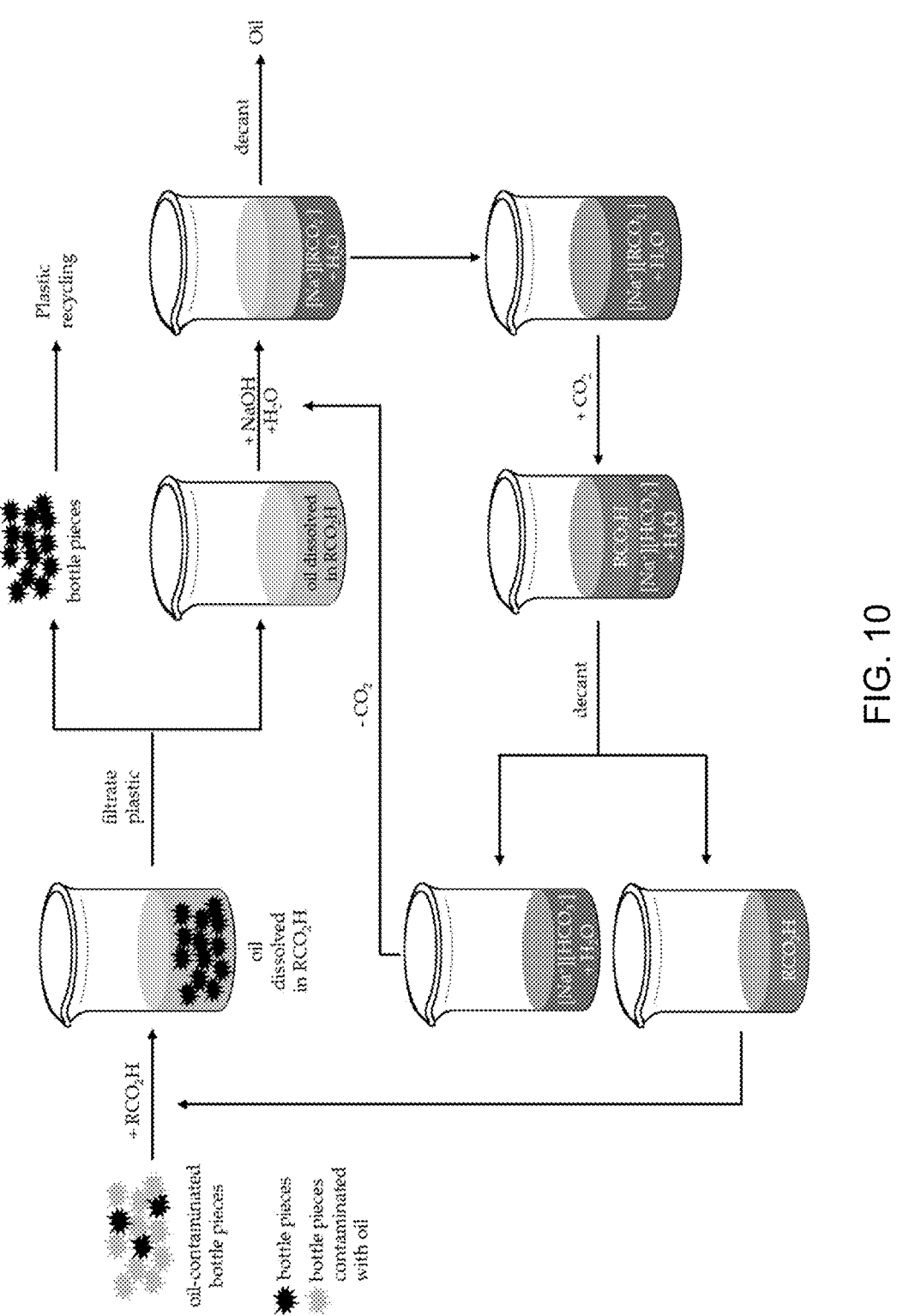

FIG. 10 illustrates the process for using an ASHS to remove motor oil from used bottles. The high-density polyethylene (HDPE) bottle pieces contaminated by the oil can be cut into small pieces and mixed with the carboxylic acid ($RCO_2H$) of the ASHS. The ASHS removes the oil from the pieces, which can be removed by filtration. To the oil and $RCO_2H$ mixture, the basic aqueous solution can be added, washing the carboxylic acid from the oil. The oil can be decanted and the aqueous solution treated with $CO_2$. The addition of $CO_2$ protonates the $RCO_2H$ which results in it forming a separate organic phase. The carboxylic acid can be decanted and reused. The aqueous solution can be decarbonated and reused in the process instead of a fresh aqueous solution of NaOH.

Figure 11:
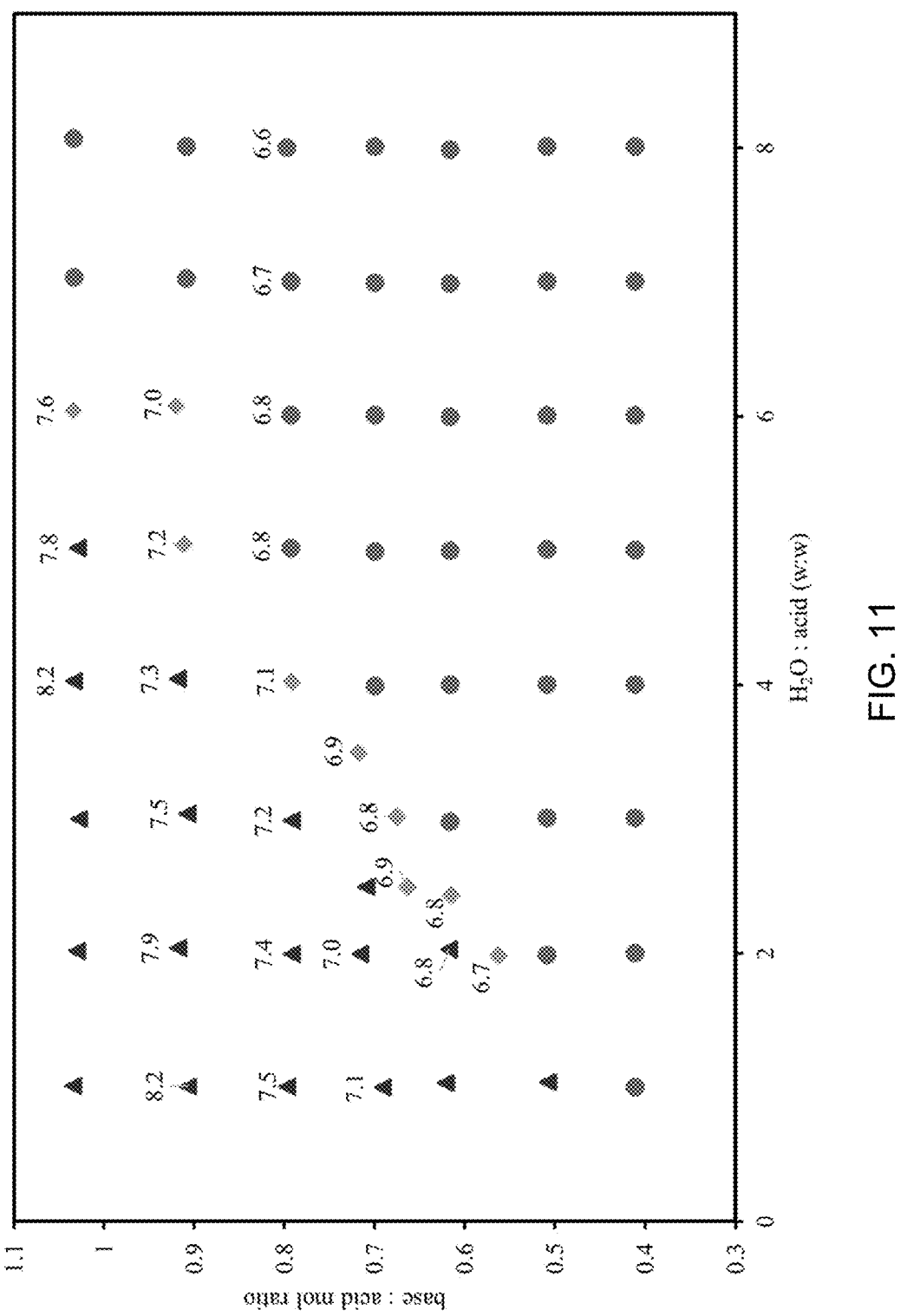

FIG. 11 is a chart illustrating ASHS behaviour for systems with varying EHA:NaOH:$H_2O$ ratios. The molar ratio for NaOH:EHA is used and for the $H_2O$:EHA the mass ratio is used. The ● denote conditions where the ratio used resulted in a system that remained biphasic under air. The ♦ are attributed to the systems where a switchable behaviour for the ASHS was observed (monophasic under air and biphasic under 1 bar of $CO_2$). The ▲ represents the systems that remained monophasic upon addition of 1 bar of $CO_2$. In addition, the pH obtained to the mixture prior to the addition of $CO_2$ is also displayed.

Figure 12:
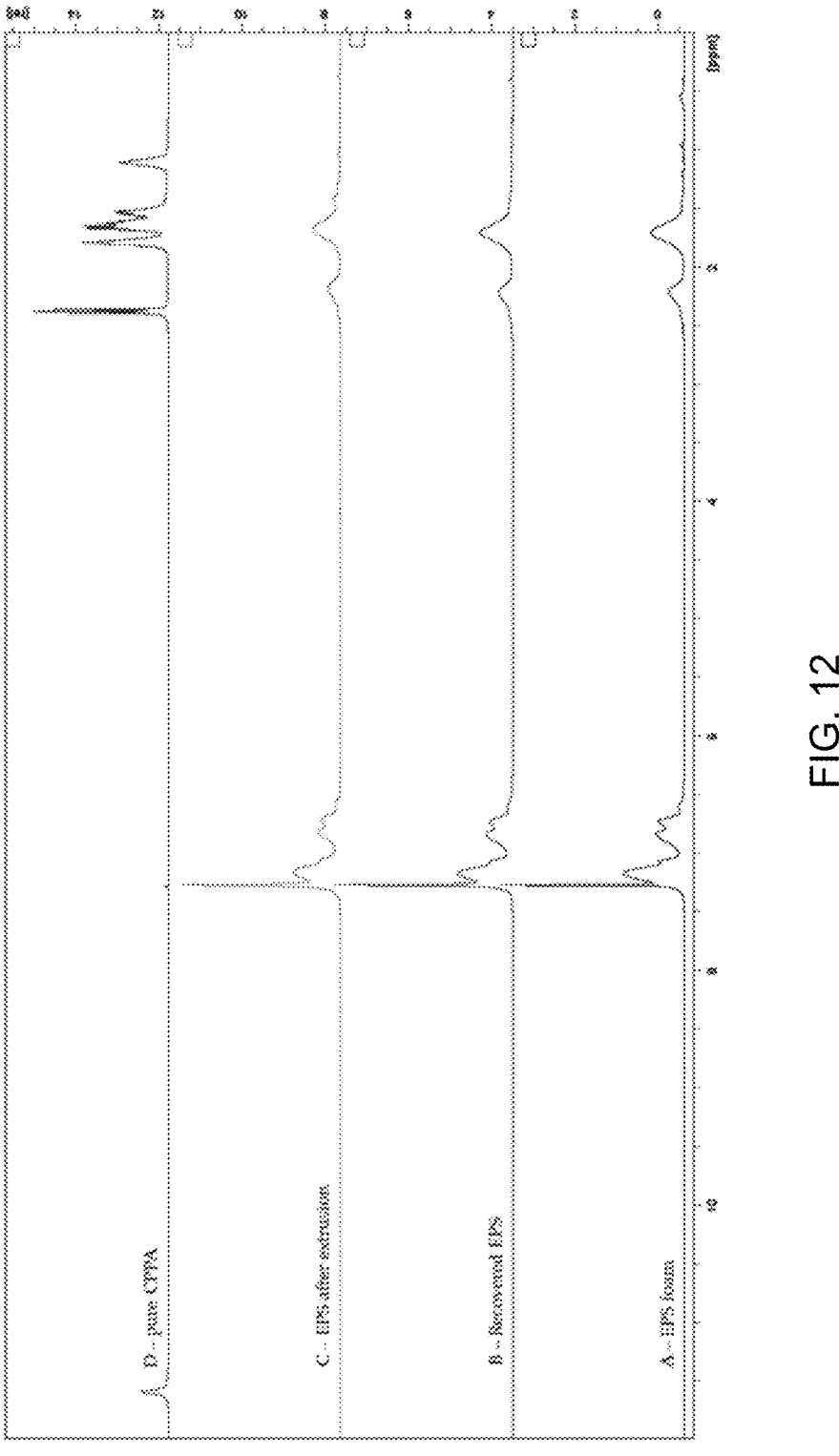

FIG. 12 illustrates $^1H$ NMR spectra demonstrating that there was no detectable contamination of the EPS powder obtained after recycling using CPPA as the solvent or after the extrusion process. The spectra were obtained using a 400 Hz NMR and $C_6D_6$ as the solvent. Spectrum A was obtained for the EPS foam; spectrum B was obtained for the EPS powder after the ASHS recycling process; spectrum C was obtained for the polymer pieces after the powder was submitted to extrusion; and spectrum D was obtained for pure CPPA.

Figure 13:
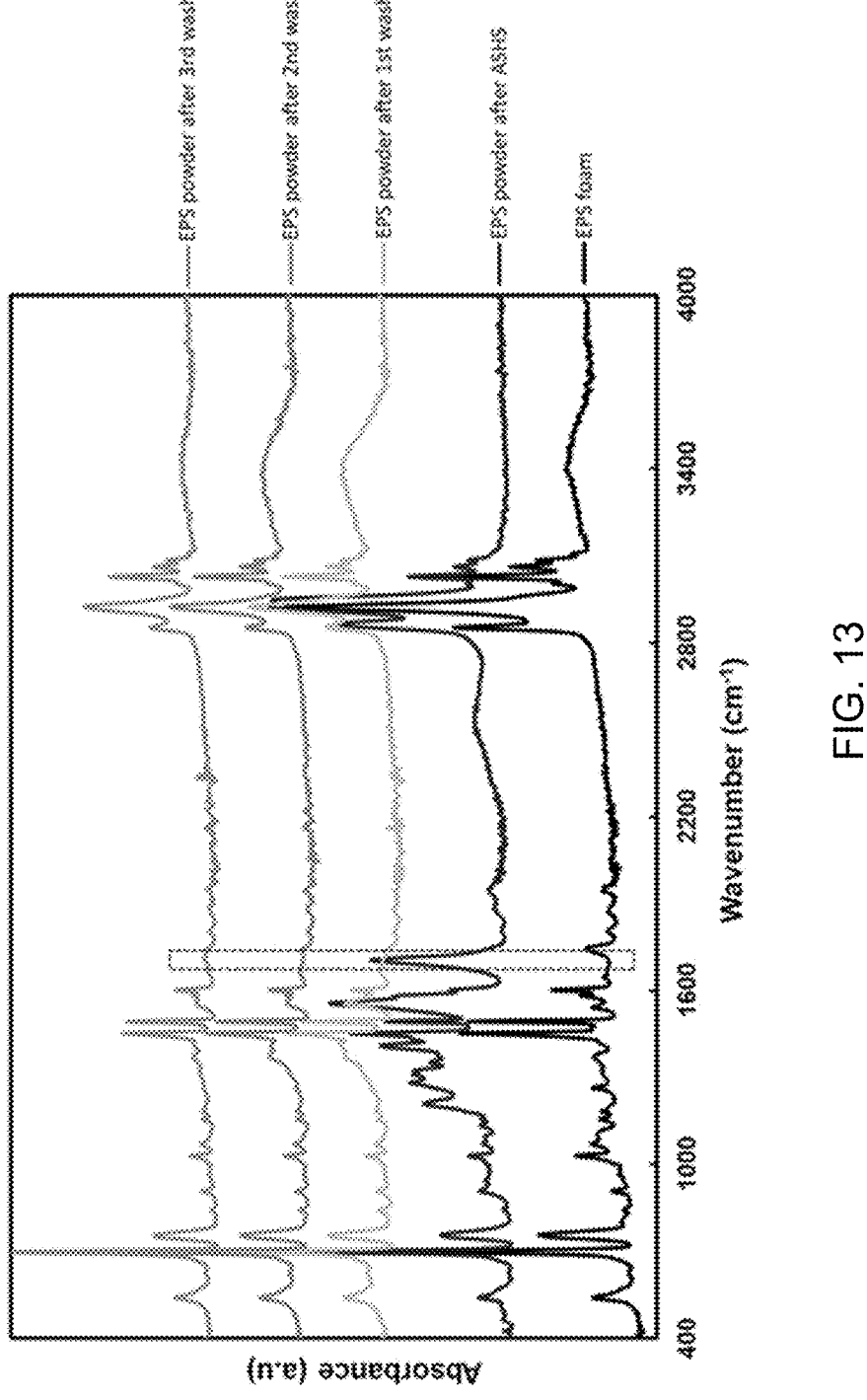

FIG. 13 illustrates FTIR-ATR spectra for EPS foam, the recovered EPS powder after the NaOH aqueous solution was added and the EPS powder after subsequent washes with the NaHCO$_3$ solution. The carbonyl peak at 1719 cm$^{-1}$ (grey box) which is associated with the presence of CPPA disappeared after the EPS was submitted to additional rinses with a NaHCO$_3$ solution, demonstrating that the rinses are a necessary step to remove any leftover ASHS even after the addition of the NaOH solution.

Figure 14:
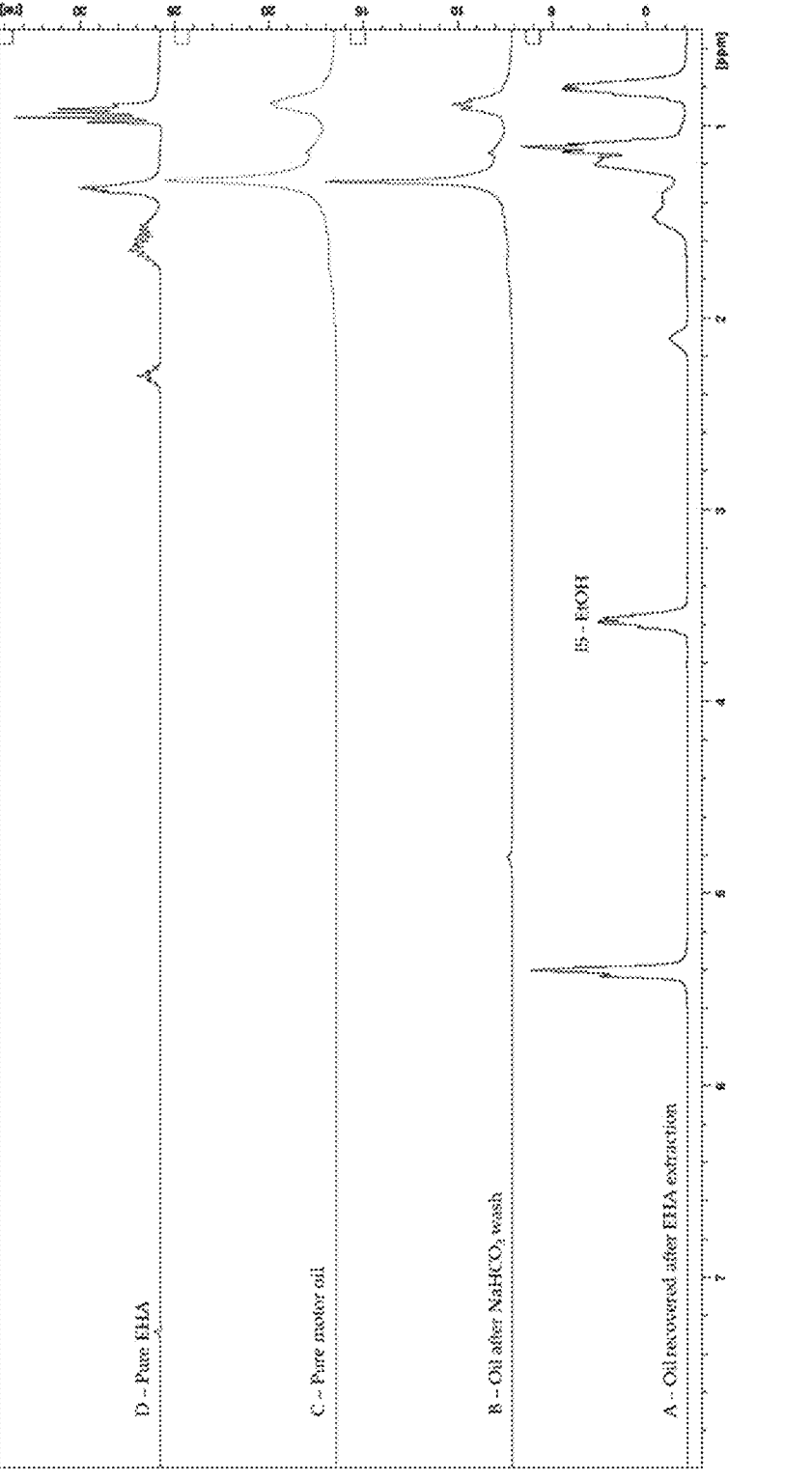

FIG. 14 illustrates $^1$H NMR spectra obtained for the oil recovered after extraction with ASHS, the oil extracted after washes with saturated NaHCO$_3$, pure motor oil and pure EHA. As observed in the spectra obtained for the recovered oil, there is still EHA mixed with the oil, as confirmed by the peaks at 5.40 and 2.10 ppm, and the overlap with the oil peaks. However, after the washes with NaHCO$_3$ the spectra obtained demonstrated that no acid was detectable by $^1$H NMR.

DETAILED DESCRIPTION OF THE INVENTION

Definitions

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) ingredient(s) and/or elements(s) as appropriate.

Terms of degree such as "substantially", "about" and "approximately" as used herein mean a reasonable amount of deviation of the modified term such that the end result is not significantly changed. These terms of degree should be construed as including a deviation of at least ±10% of the modified term if this deviation would not negate the meaning of the word it modifies.

As used herein, "substituted" means having one or more substituent moieties whose presence does not interfere with the desired reaction or react with other components of the system/method/composition taught herein. Examples of substituents include alkyl; alkenyl; alkynyl; aryl; aryl-halide; heteroaryl; cycloalkyl; Si(alkyl)$_3$; halo; alkoxyl; amino; alkylamino; dialkylamino, alkenylamino; amide; amidine; hydroxyl; thioether; hydroxycarbonyl; alkylcarbonyl; alkylcarbonyloxy; arylcarbonyloxy; alkoxycarbonyloxy; aryloxycarbonyloxy; carbonate; alkoxycarbonyl; aminocarbonyl; alkylthiocarbonyl; phosphate; phosphate ester; phosphonato; phosphinato; cyano; acylamino; imino; sulfhydryl; alkylthio; arylthio; thiocarboxylate; dithiocarboxylate; sulfate; sulfato; sulfonate; sulfamoyl; sulfonamide; nitro; nitrile; azido; heterocyclyl; ether; ester; silicon-containing moieties; thioester; or a combination thereof; and a substituent may be further substituted. It is noted that aryl halides are acceptable substituents. Alkyl halides are known to be quite reactive, and are acceptable so long as they do not interfere with the desired reaction.

As used herein, the term "unsubstituted" refers to any open valence of an atom being occupied by hydrogen. Also, if an occupant of an open valence position on an atom is not specified then it is hydrogen.

The term "switched" means that the physical properties and, in particular, the hydrophilicity have been modified. "Switchable" means able to be converted from a first state with a first set of physical properties, e.g., a hydrophobic state, to a second state with a second set of physical properties, e.g., a hydrophilic state, or vice-versa from the second state to the first state. A "trigger" is a change of conditions (e.g., introduction or removal of a gas, change in temperature) that causes a change in the physical properties, e.g. hydrophilicity. The term "reversible" means that the reaction can proceed in either direction (backward or forward) depending on the reaction conditions.

The term "non-acidic gas" means having negligible acidity (in the presence or absence of water) compared to the acidity of CO$_2$ (or another acid gas, if employed in the systems/methods/compositions described herein), and having insufficient CO$_2$ (or other acid gas) content to protonate the anionic form of the carboxylic acid in the ASHS described herein. For some applications, air may be a non-acidic gas that has substantially no carbon dioxide/insufficient CO$_2$ content to protonate the anionic form of the carboxylic acid in the ASHS described herein. Untreated air may be successfully employed, i.e., air in which the CO$_2$ content is unaltered; this would provide a cost saving. For instance, the approximately 0.04% by volume of carbon dioxide present in air is insufficient to protonate the anionic form of the carboxylic acid in the ASHS, such that air can be used to remove CO$_2$ from a solution and cause switching. Other exemplary non-acidic gases are nitrogen and argon.

While the ASHS systems/methods/compositions described herein utilize addition and removal of CO$_2$ to effect the conversion between the hydrophobic and hydrophilic forms, other acidic gases such as CS$_2$, SO$_2$, SO$_3$, or H$_2$S could also be used.

As used herein, "coating" or "coated" refers to placement of, for example, a hydrophobic material, on or proximal to a solid's surface, but does not exclude impregnation of the solid where it is able to absorb all or part of the hydrophobic material.

As used herein, "hydrophobicity" is a property of a compound or molecules of a compound leading it to be attracted to other oily substances and largely repelled from a mass of water. Hydrophobic molecules have little or no polarity and have little or no hydrogen bonding ability. Such molecules are thus compatible with other neutral and non-polar molecules. The degree of hydrophobic character of the compound, or hydrophobicity, can be quantified by a log P value. The log P is the logarithm of the 1-octanol-water partition coefficient, P, of a compound. This partition coefficient is used as an indicator of the preference of the compound to partition into a hydrophobic environment rather than a hydrophilic aqueous environment. The 1-octanol-water partition coefficient is the equilibrium constant calculated as the ratio of the concentration of the compound in the 1-octanol phase divided by the concentration of the molecule in the aqueous phase, when those two phases are in contact with each other and when the compound has been allowed enough time to reach its equilibrium concentrations in both phases. P is sometimes referred to as K$_{ow}$, and log P is sometimes referred to as log K$_{ow}$.

Because the partition coefficient is a ratio, it is dimensionless. The partition coefficient is an additive property of a molecule, because each functional group helps determine the hydrophobic or hydrophilic character of the molecule. If the log P value of an organic liquid compound, for example, is small, the compound will be miscible with water such that the water and compound will form a single-phase in most proportions. If the log P value of an organic liquid compound, for example, is large, the compound will be immiscible with water such that a two-phase liquid mixture will be formed with the water and compound present as separate layers in most proportions.

It is also possible to theoretically calculate log P values because of the additive nature of the partition coefficient arising from the individual functional groups of a molecule. A number of computer programs are available for calculating log P values. The log P values described herein are predicted using ALOGPS 2.1 software, which calculates the log P value for a given molecule using nine different algorithms and then averages the values. This computational method is fully described by Tetko I. V. and Tanchuk V. Y. in *J. Chem. Inf. Comput. Sci.*, 2002, 42, 1136-1145 and in *J. Comput. Aid. Mol. Des.*, 2005, 19, 453-463, both of which are incorporated herein by reference.

In contrast to hydrophobicity, "hydrophilicity" is a property of a molecule, wherein it is attracted to water molecules. Hydrophilic molecules are usually polar, charged, and/or capable of intramolecular hydrogen bonding with water molecules.

As used herein, "insoluble" refers to a solid in a specified liquid that is not well solubilized but rather forms a heterogeneous mixture. It is recognized that the solubility of an "insoluble" solid in a specified liquid might not be zero but rather it would be smaller than that which is useful in practice. The use of the terms "soluble", "insoluble", "solubility" and the like are not intended to imply that only a solid/liquid mixture is intended. For example, a statement that a compound is soluble in water is not meant to imply that the compound must be a solid; the possibility that the compound may be a liquid is not excluded.

As used herein, "misciblility" is a property of two liquids that when mixed at the intended proportions provide a homogeneous solution. In contrast, "immiscibility" is a property of two liquids that when mixed at the intended proportions provide a heterogeneous mixture, for instance having two distinct phases.

As used herein, "immiscible" means unable to merge into a single-phase. Thus two liquids are described as "immiscible" if they form two phases when combined in a proportion. This is not meant to imply that combinations of the two liquids will be two-phase mixtures in all proportions or under all conditions. The immiscibility of two liquids can be detected if two phases are present, for example via visual inspection. The two phases may be present as two layers of liquid, or as droplets of one phase distributed in the other phase. The use of the terms "immiscible", "miscible", "miscibility" and the like are not intended to imply that only a liquid/liquid mixture is intended. For example, a statement that a compound is miscibile with water is not meant to imply that the compound must be a liquid; the possibility that the compound may be a solid is not excluded.

For example, when referring to a carboxylic acid being a water-immiscible liquid in its neutral form, by "immiscible" or "insoluble" it is meant that the carboxylic acid forms a biphasic mixture when mixed with water at the water:carboxylic acid mass ratio used in the method.

If a compound is described as being "miscible" or "soluble" in water it is meant that the compound forms a single phase when mixed with water at the mass ratio used in the method.

As used herein, a "surfactant" refers to a chemical, that when in a mixture comprising water, stabilizes emulsions, foams, or suspensions. As such, when it is indicated that a carboxylic acid as described herein is not a surfactant in its anionic form, this means that the anionic form of the carboxylic acid, when in a mixture comprising water, fails to give emulsions, foams, or suspensions any significant added stability, during times when the mixture is not being agitated, over what would be observed in the absence of the anionic form of the carboxylic acid. Mixtures of carboxylic acids as described herein may also not exhibit surfactant behaviours in their anionic forms.

As used herein, the term "neutral" with reference to the carboxylic acids in the ASHS means that the carboxylic acid molecule is uncharged. The term "anionic" with reference to the carboxylic acids in the ASHS means that the carboxylic acid is deprotonated and in an anionic charged form.

Embodiments

As noted above, the original SHS, which are referred to herein as cationic SHS or CSHS, were amidines or tertiary amines. Although presenting many benefits, SHS offer some limitations that need to be addressed. Considering the acid-base nature of the switching process for CSHS systems, the basicity of the amine plays a crucial role. If the $pK_{aH}$ (the $pK_a$ of the protonated form of the amine) is not in an appropriate range,[63, 64] then the $CO_2$-triggered switching will only work in one direction or not at all. As a result, the restrictions imposed by the amine basicity can limit the amines that can be used or the systems that can benefit from CSHS. In addition, some of the available CSHS present undesirable levels of toxicity or harmful skin effects. As CSHS have many advantages over other solvents, the main question then becomes, how can an SHS be created that mitigates the drawbacks of the current amine systems?

An ASHS is similar in many ways to a CSHS, but the use of carboxylic acids changes the chemistry taking place. First, the carboxylic acid is used as an organic solvent, such as for extracting the hydrophobic components of a mixture (FIG. 2). Once an aqueous solution containing a water-soluble base is added, the carboxylic acid is deprotonated by the base, forming a hydrophilic salt that dissolves readily in the aqueous solution. In order to re-form the hydrophobic state of the ASHS, an atmosphere of $CO_2$ is added, and the carboxylate anion is reprotonated. A second liquid phase primarily composed of the acid is formed, which can be decanted and reused. Because the separation of the liquid carboxylic acid from the aqueous phase helps drive the protonation reaction, it allows for the protonation of the carboxylate anion to carboxylic acid to occur at a pH higher than the acid's $pK_a$ (eqn 2).[66]

(2)

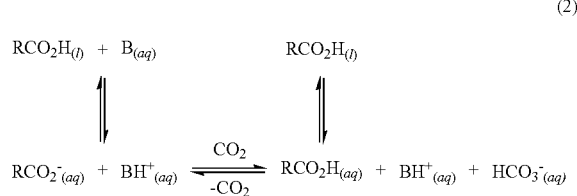

After the original mixing of the carboxylic acid with the basic amine, the protonated amine simply serves as a counter-ion and is therefore not $CO_2$-switchable. Thus, while amines were used by Chen et al., there is no reason why the counter-ion needs to be a protonated amine. It could just as easily be another cation like a quaternary ammonium or sodium cation.

Although the ASHS systems improve upon the CSHS systems, some choices made for the systems already published created three significant drawbacks to the system. Both Chen et al. and Sed et al. relied on long-chain fatty acids. Due to the surfactant nature of the corresponding fatty carboxylate anions, foaming occurs during the addition of $CO_2$.[58,61] This first issue could be addressed by utilising branched or cyclic carboxylic acids instead of straight-chain fatty acids. Second, the amount of water required (9 volumes of water for every volume of SHS) was far too high for practical applications.[61] Third, although the fatty acids are less toxic than the amines traditionally used for CSHS, the base selected for their ASHS, Jeffamine D-230, is ecotoxic. If ASHS are to be used as a potentially more environmentally friendly alternative to CSHS, these three issues need to be overcome.

Herein the inventors have addressed these three issues.

(i) the surfactancy of the carboxylate anion, (ii) the need for a large excess of water, and (iii) the toxicity of the amine used as a counter-ion.

The approaches used to solve these problems included redesigning the carboxylic acids, varying the acid/base mole ratio and replacing the amine with less harmful bases.

In one embodiment, there is provided a system for forming an anionic switchable hydrophilicity solvent comprising: a carboxylic acid, wherein the carboxylic acid is a water-immiscible liquid in its neutral form, and is water-soluble in its anionic form, at one or more selected temperatures within a selected temperature range, and/or wherein the carboxylic acid is a liquid that is immiscible with water in its neutral form under an elevated pressure of $CO_2$, and is water-soluble in its anionic form, at one or more selected temperatures within a selected temperature range; a water-soluble base, wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof; water; and a source of $CO_2$; wherein when the carboxylic acid, the water-soluble base, and the water are combined at one of the one or more selected temperatures, the water-soluble base deprotonates the carboxylic acid and converts the carboxylic acid to its anionic water-soluble form, forming an aqueous solution; and when the aqueous solution is contacted with $CO_2$ at one of the one or more selected temperatures, the anionic form of the carboxylic acid is protonated and a biphasic mixture is formed, the biphasic mixture comprising: an aqueous phase comprising water and the water-soluble base, and an organic phase comprising the carboxylic acid in its neutral form; wherein when the water-soluble base is an amine, the ratio of the water-soluble base to the carboxylic acid is substoichiometric.

In one embodiment, the water-soluble base is a basic salt containing a quaternary ammonium cation of the formula [NR4]+. In one embodiment, the water-soluble base is a basic salt containing a substituted or unsubstituted ammonium cation of the formula [NR3H]+, [NR2H2]+, [NRH3]+ or [NH4]+. In one embodiment, the water-soluble base is a basic salt containing a quaternary phosphonium cation of the formula [PR4]+. In another embodiment, the water-soluble base is a basic salt containing a substituted or unsubstituted phosphonium cation of the formula [PR3H]+, [PR2H2]+, [PRH3]+ or [PH4]+. The scope of R groups for the foregoing formulae is not particularly limited. Exemplary R groups for the N or P containing cations include those independently selected from linear, branched or cyclic alkyl, or linear, branched or cyclic substituted alkyl, where preferred substituents are hydroxy, alkoxy, substituted alkoxy, amino, or substituted amino groups. Preferred R groups are methyl and 2-hydroxyethyl.

In one embodiment, the system further comprises means for removing $CO_2$ from the biphasic mixture, wherein when $CO_2$ is removed from the biphasic mixture the carboxylic acid is deprotonated and converts to its anionic water-soluble form, re-forming the aqueous solution. In another embodiment, the means for removing $CO_2$ comprises (i) heat, (ii) a non-acidic gas, (iii) a vacuum or partial vacuum, (iv) agitation, (v) steam, (vi) use of a membrane, or (vii) any combination thereof.

In another embodiment, the water-soluble base has a $pK_{aH}$ equal to or greater than the $pK_a$ of the carboxylic acid; optionally, wherein the water-soluble base has a $pK_{aH}$ of greater than about 4, or greater than about 5.

In yet another embodiment, the water-soluble base is a primary, secondary, or tertiary amine. In another embodiment, the water-soluble base is a tertiary amine comprising at least one hydroxyl substituent. In another embodiment, a mole ratio of the amine to the carboxylic acid is from about 0.45:1 to about 0.90:1 and/or wherein a mass ratio of water to the carboxylic acid is from about 1:1 to about 6:1, or from about 1:1 to about 4:1.

In another embodiment, the water-soluble base is a basic salt containing a metal cation. In still another embodiment, the basic salt containing the metal cation is a sodium, potassium, or lithium salt. In yet another embodiment, the basic salt containing the metal cation is a hydroxide, bicarbonate, or a mixture thereof. In another embodiment, the basic salt containing the metal cation is NaOH, $NaHCO_3$, or a mixture thereof. In still yet another embodiment, a stoichiometric ratio of the basic salt containing the metal cation to the carboxylic acid is from about 0.3:1 to about 1:1 or from about 0.4:1 to about 0.9:1 and/or wherein a mass ratio of water to the carboxylic acid is from about 0.5:1 to about 9.5:1 or from about 1:1 to about 4:1.

In another embodiment, the carboxylic acid comprises one or more compounds of the formula $RCO_2H$, wherein R is a substituted or unsubstituted $C_6$ to $C_{11}$ alkyl group that is linear, branched, or cyclic, a substituted or unsubstituted $C_6$ to $C_{11}$ alkenyl group that is linear, branched, or cyclic, or a substituted or unsubstituted $C_6$ to $C_{11}$ polyunsaturated group that is linear, branched, or cyclic. In another embodiment, the carboxylic acid comprises one or more compounds of the formula $RCO_2H$, wherein R is a substituted or unsubstituted $C_6$ to $C_{11}$ alkyl group that is branched or cyclic, a substituted or unsubstituted $C_6$ to $C_{11}$ alkenyl group that is branched or cyclic, or a substituted or unsubstituted $C_6$ to $C_{11}$ polyunsaturated group that is branched or cyclic. In another embodiment, the carboxylic acid is not a surfactant in its anionic form. In still another embodiment, the neutral form of the carboxylic acid has a $\log K_{ow}$ in a range of from about 1 to about 6, or from about 2 to about 4.

As noted above, the carboxylic acid component can comprise one or more compounds of the formula $RCO_2H$—for example, the carboxylic acid component might be a mixture of two different types of carboxylic acids. In such embodiments, it is possible that the mixture of two different types of carboxylic acids is a water-immiscible liquid in its neutral form, and is water-soluble in its anionic form, at an operating temperature (one or more selected temperatures within a selected temperature range), and/or is a liquid that is immiscible with water in its neutral form under an elevated pressure of $CO_2$, and is water-soluble in its anionic form at an operating temperature, while each individual type of carboxylic acid might not be liquid in its neutral form under the same conditions when pure. For instance, a mixture of octanoic and dodecanoic acids has been found to work well in the ASHS systems/methods/compositions described herein ($C_8$ and $C_{12}$) at room temperature (as the mixture of octanoic and dodecanoic acids is a liquid at room temperature), whereas dodecanoic acid by itself has a melting point of about 43° C. and would be a solid at room temperature. Thus, dodecanoic acid by itself would not work if the operating temperature was room temperature, as the carboxylic acid needs to be a liquid at the operating temperature of the system/method.

In another embodiment, the aqueous solution is contacted with $CO_2$ at a pressure of from about 0.4 bar to about 50 bar, or from about 1 bar to about 15 bar. In still another embodiment, the elevated pressure of $CO_2$ is up to about 15 bar, or up to about 50 bar. It should be noted that these and other references to pressure of $CO_2$ referenced herein correspond to the total absolute pressure if the $CO_2$ is pure or the partial pressure of the $CO_2$ if the applied gas is impure $CO_2$ or a mixture of $CO_2$ with one or more other gases. The exact partial pressure of $CO_2$ required to get a substantial amount of the carboxylic acid out of the aqueous phase will depend on the choice and concentration of the carboxylic acid, the temperature, and the amount of base, and can readily be determined by the skilled worker.

In yet another embodiment, the selected temperature range is of from about 1° C. to about 50° C., or of from about 20° C. to about 50° C.

In another embodiment, there is provided an anionic SHS composition comprising: a carboxylic acid, wherein the carboxylic acid is a water-immiscible liquid in its neutral form, and is water-soluble in its anionic form, at one or more selected temperatures within a selected temperature range, and/or wherein the carboxylic acid is a liquid that is immiscible with water in its neutral form under an elevated pressure of $CO_2$, and is water-soluble in its anionic form, at one or more selected temperatures within a selected temperature range; a water-soluble base, wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof; water; and dissolved $CO_2$; wherein when a temperature of the composition is one of the one or more selected temperatures, and when an amount of the dissolved $CO_2$ is sufficient to maintain the carboxylic acid in its neutral form, the carboxylic acid reversibly interconverts from: (a) its anionic water-soluble form, wherein the anionic water-soluble form of the carboxylic acid forms an aqueous solution with the water-soluble base and the water, to (b) its water-immiscible neutral form, wherein the water-immiscible neutral form of the carboxylic acid forms a biphasic mixture with the water-soluble base and the water comprising: an aqueous phase comprising water and the water-soluble base, and an organic phase comprising the carboxylic acid in its neutral form; wherein when the water-soluble base is an amine, the ratio of the water-soluble base to the carboxylic acid is substoichiometric.

In other embodiments of the anionic SHS composition, the water-soluble base and carboxylic acids are as defined above. In another embodiment, the water-soluble base is an amine and the mole ratio of the amine to the carboxylic acid and/or the mass ratio of water to the carboxylic acid is as defined above. In another embodiment, the water-soluble base is a basic salt containing a metal cation and the stoichiometric ratio of the basic salt containing the metal cation to the carboxylic acid and/or the mass ratio of water to the carboxylic acid is as defined above. In another embodiment, the amount of the dissolved $CO_2$ is sufficient to maintain the carboxylic acid in its neutral form when the aqueous solution is contacted with $CO_2$ at a pressure of from about 0.4 bar to about 50 bar, or from about 1 bar to about 15 bar. In another embodiment, the elevated pressure of $CO_2$ and the selected temperature range are as defined above.

In yet another embodiment, there is provided a method of forming an anionic switchable hydrophilicity solvent comprising: (a) (i) combining in any order: a carboxylic acid, wherein the carboxylic acid is a water-immiscible liquid in its neutral form, and is water-soluble in its anionic form, at one or more selected temperatures within a selected temperature range, and/or wherein the carboxylic acid is a liquid that is immiscible with water in its neutral form under an elevated pressure of $CO_2$, and is water-soluble in its anionic form, at one or more selected temperatures within a selected temperature range; a water-soluble base, wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof; and water; wherein the water-soluble base deprotonates the carboxylic acid and converts the carboxylic acid to its anionic water-soluble form to form an aqueous solution, wherein a temperature of the aqueous solution is one of the one or more selected temperatures within the selected temperature range; wherein when the water-soluble base is an amine, the ratio of the water-soluble base to the carboxylic acid is substoichiometric; or (a) (ii) combining: a salt of a carboxylic acid and a water-soluble base, wherein the carboxylic acid is a water-immiscible liquid in its neutral form, and is water-soluble in its anionic form, at one or more selected temperatures within a selected temperature range, and/or the carboxylic acid is a liquid that is immiscible with water in its neutral form under an elevated pressure of $CO_2$, and is water-soluble in its anionic form, at one or more selected temperatures within a selected temperature range; and wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof; and water; to form an aqueous solution, wherein a temperature of the aqueous solution is one of the one or more selected temperatures within the selected temperature range; wherein when the water-soluble base is an amine, the ratio of the water-soluble base to the carboxylic acid is substoichiometric; (b) contacting the aqueous solution with $CO_2$ to protonate the anionic form of the carboxylic acid to form a biphasic mixture, wherein a temperature of the biphasic mixture is one of the one or more selected temperatures within the selected temperature range, the biphasic mixture comprising: an aqueous phase comprising water and the water-soluble base, and an organic phase comprising the carboxylic acid in its neutral form; (c) optionally, removing $CO_2$ from the biphasic mixture, wherein when $CO_2$ is removed from the biphasic mixture the carboxylic acid is deprotonated and converts to its anionic water-soluble form, re-forming the aqueous solution.

In another embodiment of the method of forming the anionic switchable hydrophilicity solvent, removing $CO_2$ comprises subjecting the biphasic mixture to (i) heat, (ii) a non-acidic gas, (iii) a vacuum or partial vacuum, (iv) agitation, (v) steam, or (vi) use of a membrane, or (vii) any combination thereof. In other embodiments, the water-soluble base and carboxylic acids are as defined above. In another embodiment, the water-soluble base is an amine and the mole ratio of the amine to the carboxylic acid and/or the mass ratio of water to the carboxylic acid is as defined above. In another embodiment, the water-soluble base is a basic salt containing a metal cation and the stoichiometric ratio of the basic salt containing the metal cation to the carboxylic acid and/or the mass ratio of water to the carboxylic acid is as defined above. In another embodiment, the aqueous solution is contacted with $CO_2$ at a pressure of from about 0.4 bar to about 50 bar, or from about 1 bar to about 15 bar. In another embodiment, the elevated pressure of $CO_2$ and the selected temperature range are as defined above.

In still yet another embodiment, there is provided a method for separating a selected substance from a mixture using an anionic switchable hydrophilicity solvent, comprising: (a) adding a carboxylic acid in its neutral form that is in a liquid state to a mixture comprising a selected substance that is water-immiscible or water-insoluble, wherein the carboxylic acid is a water-immiscible liquid in its neutral form, and is water-soluble in its anionic form, at one or more selected temperatures within a selected temperature range, and/or wherein the carboxylic acid is a liquid that is immiscible with water in its neutral form under an elevated pressure of $CO_2$, and is water-soluble in its anionic form, at one or more selected temperatures within a selected temperature range; (b) allowing the carboxylic acid to solubilize the selected substance to form a second mixture; (c) optionally isolating insoluble material from the second mixture; (d) contacting the second mixture with water and a water-soluble base, wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof, wherein the water-soluble base deprotonates the carboxylic acid and converts the carboxylic acid to its anionic water-soluble form to form a two-phase mixture having: a first hydrophobic phase comprising the selected substance, and a second aqueous phase comprising the carboxylic acid in its anionic water-soluble form, wherein a temperature of the two-phase mixture is one of the one or more selected temperatures within the selected temperature range, wherein when the water-soluble base is an amine, the ratio of the water-soluble base to the carboxylic acid is substoichiometric; and (e) separating the first hydrophobic phase from the second aqueous phase; (f) contacting the second aqueous phase with $CO_2$ to protonate the anionic form of the carboxylic acid to form a biphasic mixture, wherein a temperature of the biphasic mixture is one of the one or more selected temperatures within the selected temperature range, the biphasic mixture comprising: an aqueous phase comprising water and the water-soluble base, and an organic phase comprising the carboxylic acid in its neutral form; and (g) separating the organic phase from the aqueous phase to recover the carboxylic acid; wherein the selected substance is not reactive with the carboxylic acid, the water-soluble base, or a combination thereof.

In another embodiment of the method for separating a selected substance from a mixture, the method further comprises recycling the recovered carboxylic acid to step (a). In yet another embodiment, the method further comprises recycling the aqueous phase comprising water and the water-soluble base to step (d) and contacting the second mixture therewith to form a combined mixture, wherein step (d) further comprises removing $CO_2$ from the combined mixture (such that the water-soluble base can then be reused to deprotonate the carboxylic acid as outlined above). In still another embodiment, removing $CO_2$ comprises subjecting the combined mixture to (i) heat, (ii) a non-acidic gas, (iii) a vacuum or partial vacuum, (iv) agitation, (v) steam, or (vi) use of a membrane, or (vii) any combination thereof. In other embodiments, the water-soluble base and carboxylic acids are as defined above. In another embodiment, the water-soluble base is an amine and the mole ratio of the amine to the carboxylic acid and/or the mass ratio of water to the carboxylic acid is as defined above. In another embodiment, the water-soluble base is a basic salt containing a metal cation and the stoichiometric ratio of the basic salt containing the metal cation to the carboxylic acid and/or the mass ratio of water to the carboxylic acid is as defined above. In another embodiment, the second aqueous phase is contacted with $CO_2$ at a pressure of from about 0.4 bar to about 50 bar, or from about 1 bar to about 15 bar. In another embodiment, the elevated pressure of $CO_2$ and the selected temperature range are as defined above.

It will be understood to the skilled worker that the method for separating a selected substance from a mixture using an anionic switchable hydrophilicity solvent (ASHS) as outlined herein has many and varied applications. For instance, in one embodiment, the mixture is a natural feedstock and the selected substance is a desired oil to be extracted from same. For example, the ASHS can be used to extract oils, fats, essential oils, waxes, resins, and other hydrophobic compounds or mixtures thereof from natural feedstocks, such as soybean oil from soybeans, algae oil from algae, nut oils from nuts, seed oils from seeds, and fats and oils from other parts of plants, vegetables, or fruit. Examples include extraction of canola oil from canola plants, almond oil from almonds, and hemp seed oil from hemp seed. Such oils may be used for a vast number of uses including human or animal consumption, lubricants, and cosmetics. Thus, the ASHS can be used to isolate desirable hydrophobic compounds (selected substances) from a mixture comprising biological material (e.g. of plant, animal, or microbial origin). In another embodiment, the ASHS can be used for deinking paper to facilitate recycling of paper including newsprint (wherein the mixture would be the paper/newsprint, and the selected substance would be the ink). In another embodiment, the ASHS can be used to dissolve a selected polymer that is in a mixture of reclaimed and recycled material, wherein the selected polymer is the selected substance. In still another embodiment, the ASHS can be used to remove a hydrophobic compound from clothing, wherein the hydrophobic material is the selected substance.

In a further embodiment, there is provided a method of removing gas from polymeric foam using an anionic switchable hydrophilicity solvent, comprising: (a) contacting a polymeric foam with a carboxylic acid in its neutral form that is in a liquid state, wherein the carboxylic acid is a water-immiscible liquid in its neutral form, and is water-soluble in its anionic form, at one or more selected temperatures within a selected temperature range, and/or wherein the carboxylic acid is a liquid that is immiscible with water in its neutral form under an elevated pressure of $CO_2$, and is water-soluble in its anionic form, at one or more selected temperatures within a selected temperature range; (b) allowing the carboxylic acid to solubilize the polymeric foam to form a solution; (c) contacting the solution of (b) with water and a water-soluble base, wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof, wherein the water-soluble base deprotonates the carboxylic acid and converts the carboxylic acid to its anionic water-soluble form to form a two-phase mixture having: a first solid phase comprising the polymer, and a second aqueous phase comprising the carboxylic acid in its anionic water-soluble form, wherein a temperature of the two-phase mixture is one of the one or more selected temperatures within the selected temperature range, wherein when the water-soluble base is an amine, the ratio of the water-soluble base to the carboxylic acid is substoichiometric; and (d) separating the first solid phase from the second aqueous phase; (e) contacting the second aqueous phase with $CO_2$ to protonate the anionic form of the carboxylic acid to form a biphasic mixture, wherein a temperature of the biphasic mixture is one of the one or more selected temperatures within the selected temperature range, the biphasic mixture comprising: an aqueous phase comprising water and the water-soluble base, and an organic phase comprising the carboxylic acid in its neutral form; and (f) separating the organic phase from the aqueous phase to recover the carboxylic acid. In one embodiment, in step (c), the solution of (b) is first contacted with water and then the combination of the solution of (b) and water is subsequently contacted with the water-soluble base.

In another embodiment of the method of removing gas from polymeric foam, the method further comprises recycling the recovered carboxylic acid to step (a). In yet another embodiment, the method further comprises recycling the aqueous phase comprising water and the water-soluble base to step (c) and contacting the solution of (b) therewith to form a combined mixture, wherein step (c) further comprises removing $CO_2$ from the combined mixture (such that the water-soluble base can then be reused to deprotonate the carboxylic acid as outlined above). In another embodiment, removing $CO_2$ comprises subjecting the combined mixture to (i) heat, (ii) a non-acidic gas, (iii) a vacuum or partial vacuum, (iv) agitation, (v) steam, or (vi) use of a membrane, or (vii) any combination thereof. In other embodiments, the water-soluble base and carboxylic acids are as defined above. In another embodiment, the water-soluble base is an amine and the mole ratio of the amine to the carboxylic acid and/or the mass ratio of water to the carboxylic acid is as defined above. In another embodiment, the water-soluble base is a basic salt containing a metal cation and the stoichiometric ratio of the basic salt containing the metal cation to the carboxylic acid and/or the mass ratio of water to the carboxylic acid is as defined above. In another embodiment, the second aqueous phase is contacted with $CO_2$ at a pressure of from about 0.4 bar to about 50 bar, or from about 1 bar to about 15 bar. In another embodiment, the elevated pressure of $CO_2$ and the selected temperature range are as defined above.

Polystyrene foam treated in the foregoing manner can include expanded polystyrene foam, extruded polystyrene foam, rigid polystyrene foam, high impact thin polystyrene, or polystyrene foam packing chips.

In another embodiment, there is provided a method of extracting a hydrophobic material from a solid that is at least partially coated by the hydrophobic material using an anionic switchable hydrophilicity solvent, comprising: (a) combining the solid that is at least partially coated by a hydrophobic material with a carboxylic acid in its neutral form that is in a liquid state, wherein the carboxylic acid is a water-immiscible liquid in its neutral form, and is water-soluble in its anionic form, at one or more selected temperatures within a selected temperature range, and/or wherein the carboxylic acid is a liquid that is immiscible with water in its neutral form under an elevated pressure of $CO_2$, and is water-soluble in its anionic form, at one or more selected temperatures within a selected temperature range, to form a mixture of the solid in a homogeneous single-phase liquid, said single-phase liquid comprising the carboxylic acid in its neutral form and the hydrophobic material; (b) separating the solid from the single-phase liquid; (c) contacting the single-phase liquid with water and a water-soluble base, wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof, wherein the water-soluble base deprotonates the carboxylic acid and converts the carboxylic acid to its anionic water-soluble form to form a two-phase mixture having: a first hydrophobic phase comprising the hydrophobic material, and a second aqueous phase comprising the carboxylic acid in its anionic water-soluble form, wherein a temperature of the two-phase mixture is one of the one or more selected temperatures within the selected temperature range, wherein when the water-soluble base is an amine, the ratio of the water-soluble base to the carboxylic acid is substoichiometric; and (d) separating the first hydrophobic phase from the second aqueous phase; (e) contacting the second aqueous phase with $CO_2$ to protonate the anionic form of the carboxylic acid to form a biphasic mixture, wherein a temperature of the biphasic mixture is one of the one or more selected temperatures within the selected temperature range, the biphasic mixture comprising: an aqueous phase comprising water and the water-soluble base, and an organic phase comprising the carboxylic acid in its neutral form; and (f) separating the organic phase from the aqueous phase to recover the carboxylic acid; wherein the hydrophobic material is not reactive with the carboxylic acid, the water-soluble base, or a combination thereof.

In another embodiment of the method of extracting a hydrophobic material from a solid that is at least partially coated by the hydrophobic material, the method further comprises recycling the recovered carboxylic acid to step (a). In another embodiment, the method further comprises recycling the aqueous phase comprising water and the water-soluble base to step (c) and contacting the single phase liquid therewith to form a combined mixture, wherein step (c) further comprises removing $CO_2$ from the combined mixture (such that the water-soluble base can then be reused to deprotonate the carboxylic acid as outlined above). In another embodiment, removing $CO_2$ comprises subjecting the combined mixture to (i) heat, (ii) a non-acidic gas, (iii) a vacuum or partial vacuum, (iv) agitation, (v) steam, or (vi) use of a membrane, or (vii) any combination thereof. In other embodiments, the water-soluble base and carboxylic acids are as defined above. In another embodiment, the water-soluble base is an amine and the mole ratio of the amine to the carboxylic acid and/or the mass ratio of water to the carboxylic acid is as defined above. In another embodiment, the water-soluble base is a basic salt containing a metal cation and the stoichiometric ratio of the basic salt containing the metal cation to the carboxylic acid and/or the mass ratio of water to the carboxylic acid is as defined above. In another embodiment, the second aqueous phase is contacted with $CO_2$ at a pressure of from about 0.4 bar to about 50 bar, or from about 1 bar to about 15 bar. In another embodiment, the elevated pressure of $CO_2$ and the selected temperature range are as defined above. In yet another embodiment, the hydrophobic material is oil (e.g., motor oil) and the solid is plastic (e.g., polyethylene).

It will be understood to the skilled worker that the method of extracting a hydrophobic material from a solid that is at least partially coated by the hydrophobic material using an ASHS as outlined herein has many and varied applications. Embodiments include extracting drilling fluid and/or oil (hydrophobic materials) from drilling fines/cuttings (solid that is at least partially coated by the hydrophobic material) to facilitate disposal thereof; extracting tar (hydrophobic material) from roof shingles (wherein the gravel and paper backing of the roof shingles are the solid that is at least partially coated by the hydrophobic material); extraction of lubricant or cooling oil (hydrophobic materials) from machined metal parts (solid that is at least partially coated by the hydrophobic material); remediation of soil contaminated by a water-immiscible hydrophobic material via extraction of the hydrophobic material therefrom using the ASHS— e.g. extraction of oil (hydrophobic material) from oil sands (solid that is at least partially coated by the hydrophobic material); etc. It should be noted that examples provided above for the method for separating a selected substance from a mixture using an ASHS also apply for the method of extracting a hydrophobic material from a solid that is at least partially coated by the hydrophobic material in instances where the mixture comprises such a solid—e.g. deinking paper to facilitate recycling of paper including newsprint (wherein the solid would be the paper, and the hydrophobic material would be the ink), removing a hydrophobic compound from clothing, etc.

In the systems/methods/compositions disclosed herein, it should be understood that reference to use of a carboxylic acid in its neutral form that is in a liquid state does not require that the carboxylic acid is in pure form—for example, it is possible that some water can also be present. In addition, different types of carboxylic acids can be used in combination in the systems/methods/compositions disclosed herein, so long as the combined carboxylic acid exhibits the specified behaviour. If fatty acids obtained by hydrolysis of natural lipids are used, for example, then the carboxylic acid may in fact be a complex mixture of many fatty acids.

Selecting the Base

Appropriate water-soluble bases for use in the systems, compositions, and methods disclosed herein are set forth above.

ASHS systems have required a water-soluble base, typically an amine, to deprotonate the acid so that the system is monophasic under air. The base must be highly hydrophilic and soluble in water and carbonated water. High hydrophilicity is necessary to ensure that the base remains in the aqueous phase of the system rather than partitioning partly into the organic phase.

If the base in the ASHS system is to be an amine, which has always been the case so far, then the toxicity of the amine is a crucial factor to consider, as it is likely to be the most toxic component of the system. The ASHS study published by Chen et al. uses Jeffamine D-230, which is corrosive to skin and eyes (GHS H314 and H318) and harmful to aquatic life with long-lasting effects (GHS H412).[58] Presented below are alternative ASHS systems in which D-230 is replaced with less harmful bases.

Possible amines studied were tertiary amines with at least one hydroxyl substituent. Tertiary amines were selected, as primary or secondary amines might form carbamate salts, which would make a significant portion of the amine molecules unavailable to deprotonate the carboxylic acid.[64] Many alkanolamines are readily available, less expensive, and less harmful than D-230.[67]

If one wishes to avoid amines altogether, an alternative approach involves using a basic salt containing a metal cation. Some inorganic bases, like $NaHCO_3$ and NaOH, are less harmful than D-230. For that reason, those two inorganic bases have been investigated herein. In this scenario, $Na^+$ functions as the counter-ion for the deprotonated acid in the aqueous phase instead of protonated amine $BH^+$. Since NaOH and $NaHCO_3$ are hydrophilic and trace amounts of sodium are neither particularly harmful nor prone to discolouring the product, there is a reduced concern regarding contamination of the final extract obtained.

Selecting the Carboxylic Acid

Appropriate carboxylic acids for use in the systems, compositions, and methods disclosed herein are set forth above.

The carboxylic acid used in the ASHS system is the key component for the separation to work. If the operating temperature is room temperature, the carboxylic acid must be liquid at room temperature and have low solubility in water in its neutral form.[68] In one embodiment, the carboxylic acid is a water-immiscible liquid in its neutral form, and is water-soluble in its anionic form, at one or more selected temperatures within a selected temperature range (e.g. of from about 20° C. to about 50° C.). In another embodiment, the carboxylic acid is a liquid that is immiscible with water in its neutral form under an elevated pressure of $CO_2$, and is water-soluble in its anionic form, at one or more selected temperatures within a selected temperature range (e.g. of from about 20° C. to about 50° C.). These temperature ranges take into account the fact that the operating temperature of the ASHS systems and methods outlined herein may vary, and can range from room temperature (i.e. about 20° C. to about 24° C.) to about 50° C., for example about 40° C. Liquid hydrophobic carboxylic acids satisfying the above parameters are utilized in the ASHS systems and methods outlined herein.

The carboxylic acid would preferably not behave as a surfactant in its anionic form.[68] Surfactant character compromises the utility of the ASHS because a surface-active carboxylate anion would stabilise unwanted foams, emulsions, or suspensions during the separation process.[69] The ASHS system developed by Chen et al. uses octanoic acid, the anion of which is a surfactant and stabilises emulsions and foams.[58] As a result, ASHS systems using octanoic acid lead to unwanted foaming when $CO_2$ is bubbled through the solution. This may or may not be acceptable, depending on the application. Acids with short linear chains are more soluble in water and therefore do not separate from the aqueous phase when 1 bar of $CO_2$ is applied. Therefore, hydrophobic acids with branched or cyclic carbon chains are desired in place of straight-chain fatty acids. In some applications, straight chain carboxylic acids may be preferred, despite the tendency of their anionic forms to stabilize emulsions, foams, and suspensions, because many such acids have low toxicity, low prices, and are available from biomass.

The toxicity of the carboxylic acid is also of interest, as the acid interacts with the desired products. Because residual ASHS components might remain in any solid or liquid products, toxicity must be minimised. The carboxylic acids previously used for ASHS[68,61] are naturally abundant and have low toxicity but cause ecotoxicity and significant skin and eye corrosion. Branched or cyclic hydrophobic acids with minimal toxicity and ecotoxicity would be ideal for use in the ASHS system. In some cases, carboxylic acids containing carbon-carbon double bonds would not be preferred because such acids may be prone to oxidation, rancidification, and discolouration.

Systems with a Stoichiometric Amount of Base

There are certain criteria that must be met for a carboxylic acid/base/water mixture to exhibit ASHS behaviour. First, the system must be monophasic under air. The system should become biphasic upon the addition of $CO_2$. It is also important that the system returns to a monophasic state when $CO_2$ is removed and that switching can be repeated multiple times without significant loss of separation efficiency. In order to seek better ASHS, tests were carried out with different acid and base combinations, varying base:acid mole ratios and water:acid mass ratios, and variations on the $CO_2$ pressure applied.

The first tests evaluated the use of less basic amines. The original work by Chen et al.[58] made use of an ecotoxic and relatively basic amine, Jeffamine D-230. Decreasing the initial pH of the acid/base/water mixture could facilitate the separation once $CO_2$ is added, since the protonation of the carboxylic acid occurs at lower pH values. Following the procedure used by Chen et al. in which the base:acid mole ratio was 1:1 and the water:acid mass ratio was 15:1, mixtures containing octanoic acid, EHA, PPA, or CPPA as the acid and either Jeffamine D-230, triethanolamine (TEA), N-methyldiethanolamine (MDEA), N,N-dimethyletha-nolamine (DMEA) or 3-dimethylamino-1-propanol (3DMAP) as the base were prepared (Scheme 1). In addition, attempts were made at different water:acid mass ratios (Table 1). Upon addition of 1 bar of $CO_2$, no phase separation was observed, meaning the % protonation of the carboxylic acid was not sufficient to initiate the formation of the acid-phase. As a result, a series of modifications were attempted to obtain a successful ASHS combination.

Scheme 1 Carboxylic acids and amines used to prepare ASHS is this study.

TABLE 1

Comparison among the carboxylic acid and bases combinations at varying water:acid mass ratios. The pH and the behaviour of the system are presented.

| BASE | CARBOXYLIC ACID | H2O:ACID MASS RATIO | PH UNDER AIR | PH UNDER 1 BAR OF CO2 | BEHAVIOUR OF THE SYSTEM AFTER CO2 ADDITION |
|---|---|---|---|---|---|
| Jeffamine D-230 | Octanoic acid | 1:1-9.5:1 | Between 7.60-7.90 | Between 6.85-7.60 | No phase separation |
| Jeffamine D-230 | Octanoic acid[a] | 15:1 | 7.55 | 6.70 | Partial phase separation[b] |
| Jeffamine D-230 | CPPA | 12:1 | 7.00 | 6.55 | No phase separation |
| Jeffamine D-230 | CPPA | 15:1 | 6.94 | 6.45 | No phase separation |
| Jeffamine D-230 | PPA | 12:1 | 7.86 | 6.84 | Partial phase separation |
| Jeffamine D-230 | PPA | 15:1 | 8.43 | 6.73 | Partial phase separation |
| Jeffamine D-230 | EHA | 12:1 | 6.98 | 6.94 | Partial phase separation |
| Jeffamine D-230 | EHA | 15:1 | 8.34 | 6.74 | Partial phase separation |
| TEA, MDEA, DMEA or 3-DMAP | Octanoic acid | 12:1-15:1 | 7.60-7.70 | 6.70-6.90 | No phase separation |

TABLE 1-continued

Comparison among the carboxylic acid and bases combinations at varying water:acid
mass ratios. The pH and the behaviour of the system are presented.

| BASE | CARBOXYLIC ACID | $H_2O$:ACID MASS RATIO | PH UNDER AIR | PH UNDER 1 BAR OF $CO_2$ | BEHAVIOUR OF THE SYSTEM AFTER $CO_2$ ADDITION |
|---|---|---|---|---|---|
| TEA, MDEA, DMEA or 3-DMAP | EHA | 1:1 | 7.50-8.30 | 7.50-8.05 | No phase separation |
| TEA, MDEA, DMEA or 3-DMAP | EHA | 2:1 | 8.00-8.15 | 7.20-7.60 | No phase separation |
| TEA, MDEA, DMEA or 3-DMAP | EHA | 6:1 | 7.50-8.10 | 6.20-6.70 | No phase separation |
| TEA, MDEA, DMEA or 3-DMAP | EHA | 15:1 | 6.80-7.90 | 6.60-6.80 | No phase separation |

The temperature was maintained at 20° C. The $CO_2$ pressure used for all the experiments was 1 bar ($CO_2$ was added via a dispersion tube). The base:acid mol ratio was maintained at 1:1, except for the systems containing Jeffamine D-230. Because it has two basic sites, two moles of carboxylic acid were used per mole of D-230.
[a]Sample was prepared following the same ratios described by Chen et al.[58] The results obtained were also similar.
[b]The "partial phase separation" label was used for systems where the amount of carboxylic acid recovered after the addition of $CO_2$ was smaller than the mass of carboxylic acid added.

Systems with a Substoichiometric Amount of Base

The next series of tests varied the base:acid ratio. In the previous examples,[58,61] the base:acid mole ratio was maintained at 1:1. For the systems described here, this ratio was decreased, and different base:acid ratios were explored. Base was added until a monophasic mixture was obtained under air.

The results with different amounts of base can best be understood by comparing the pH of the solution under air ($pH_{air}$) to the system midpoint. For a system to be successful, the $pH_{air}$ must be above the system midpoint pH to ensure that the acid is primarily in the anionic form. The system midpoint pH refers to the pH at which 50% of the acid has been protonated, regardless of the location of the acid in the system.[64, 66] Because phase separation occurs, the system midpoint is not equal to the $pK_a$ of the acid. The $pH_{air}$ needs to be close enough to the system midpoint that the addition of 1 bar of $CO_2$ can lower the pH below the system midpoint. For most base/acid combinations, a 1:1 mole ratio produced a $pH_{air}$ so far above the system midpoint that the addition of 1 bar of $CO_2$ could not lower the pH enough. It was observed that the addition of substoichiometric amounts of base created solutions with $pH_{air}$ values only slightly above the system midpoint. Only for those samples was the addition of 1 bar of $CO_2$ able to trigger the formation of a separate liquid acid phase. Table 2 compiles the acid:alkanolamines combinations attempted.

Although phase separation was observed with the systems containing substoichiometric amounts of alkanolamines, there were still issues with some of the combinations. A threshold of 50% volume recovered was set to identify the successful systems. Some of the combinations crossed that threshold. However, even though a switchable behaviour was observed, the carboxylic acid (organic) phase was in some cases significantly larger in volume than the amount of carboxylic acid initially added to the system. This observation, when it occurred, was an indication that both base and water were being drawn from the aqueous phase into the acid phase (confirmed via GC-FID). This issue had to be addressed because reusing the acid was not possible due to the excessive contamination with water and amine. This contamination impacted any attempts made to deprotonate the acid using a fresh aqueous base solution. Although full recovery of the carboxylic acid was not achieved, the utilisation of substoichiometric amounts of the base led to substantial acid recovery for combinations of CPPA, PPA or EHA with one or more of the amines.

During the experiments with substoichiometric amounts of the base, another modification was also successfully attempted. As previously pointed out, past ASHS required very large volumes of water, at least 9.5 g of water per g of carboxylic acid. All of our attempts at using less water failed when the base:acid mole ratio was 1:1. The pH under $CO_2$ was too high, and no phase separation was observed. However, once the base:acid molar ratio was decreased, it became possible to use less water.

TABLE 2

Comparison among the carboxylic acid and bases combinations with a substoichiometric
amount of base. The pH and the behaviour of the system are presented.

| CARBOXYLIC ACID | BASE | BASE:ACID MOLE RATIO | PH UNDER AIR | PH UNDER 1 BAR OF $CO_2$ | BEHAVIOUR OF THE SYSTEM AFTER $CO_2$ ADDITION |
|---|---|---|---|---|---|
| Octanoic acid | TEA | 0.65:1 | 6.68 | 6.75 | No phase separation |
| Octanoic acid | MDEA | 0.65:1 | 6.69 | 6.65 | No phase separation |
| Octanoic acid | DMEA | 0.60:1 | 6.86 | 6.71 | Phase separation below 50 vol % |
| Octanoic acid | 3DMAP | 0.55:1 | 6.34 | 6.46 | Phase separation below 50 vol % |
| CPPA | TEA | 0.40:1 | 5.98 | 6.04 | No phase separation |
| CPPA | MDEA | 0.50:1 | 6.16 | 6.23 | No phase separation |

TABLE 2-continued

Comparison among the carboxylic acid and bases combinations with a substoichiometric
amount of base. The pH and the behaviour of the system are presented.

| CARBOXYLIC ACID | BASE | BASE:ACID MOLE RATIO | PH UNDER AIR | PH UNDER 1 BAR OF CO$_2$ | BEHAVIOUR OF THE SYSTEM AFTER CO$_2$ ADDITION |
|---|---|---|---|---|---|
| CPPA | DMEA | 0.50:1 | 6.22 | 6.25 | No phase separation |
| CPPA | 3DMAP | 0.45:1 | 6.06 | 6.02 | Phase separation above 50 vol % |
| PPA | TEA | 0.60:1 | 6.51 | 6.72 | No phase separation |
| PPA | MDEA | 0.55:1 | 6.59 | 6.69 | Phase separation above 50 vol % |
| PPA | DMEA | 0.55:1 | 6.70 | 6.78 | Phase separation above 50 vol % |
| PPA | 3DMAP | 0.60:1 | 6.63 | 6.70 | Phase separation above 50 vol % |
| EHA | TEA | 0.55:1 | 6.48 | 6.53 | No phase separation |
| EHA | MDEA | 0.55:1 | 6.50 | 6.61 | No phase separation |
| EHA | DMEA | 0.55:1 | 6.57 | 6.69 | Phase separation above 50 vol % |
| EHA | 3DMAP | 0.50:1 | 6.53 | 6.64 | Phase separation above 50 vol % |

The temperature was maintained at 20° C..
The CO$_2$ pressure used for all the experiments was 1 bar (CO$_2$ was added via a dipersion tube).
H$_2$O:acid mass ratio was maintained at 2.5:1.

For the same systems presented in Table 1, it was possible to decrease the water:acid mass ratio to 2.5:1 and still observe phase separation upon CO$_2$ addition. Unfortunately, the volume of the acid-phase was still above the initial volume of acid added.

Systems with an Inorganic Base

Because none of the carboxylic acid/amine combinations were completely satisfactory, the use of inorganic bases instead of amines was explored. Salts and bases having an inorganic counter-ion could be more prone to remain in the aqueous phase after the addition of CO$_2$ to the system. The use of NaOH as the base has the additional advantage of reducing the overall ecotoxicity of the system, considering that NaOH and the eventual NaHCO$_3$ (formed upon addition of CO$_2$) present lower environmental impacts compared to alkanolamines. When three carboxylic acids, EHA, PPA and CPPA, were tested as ASHS in combination with substoichiometric amounts of aqueous NaOH solutions, one phase was observed under air. The base:acid molar ratio had to be adjusted due to the use of NaOH, and for these particular systems, 0.6 to 0.7 equivalents of base were used depending on the acid-base combination. Upon addition of CO$_2$, phase separation was observed, and the volume of the acid phase remained below the initial volume of carboxylic acid added. This was an improvement considering that the contamination of the acid phase with water or base for these new systems was not as problematic as before. On the other hand, the aqueous phase still contained some of the carboxylic acid. Nevertheless, the improvements obtained using substoichiometric amounts of NaOH as the base for the ASHS system prompted further exploration of these combinations.

Exploring the Choice of Carboxylic Acid for Pairing with NaOH

Carboxylic acids with a range of log K$_{ow}$ values were tested (additional data for the carboxylic acid:NaOH:H$_2$O ratios used can be seen in Table 4). The systems were grouped based on their behaviour under air and after the addition of CO$_2$. As seen in FIG. 3, six carboxylic acids have been identified as ASHS within a log K$_{ow}$ range of approximately 2-4. The upper limit of the range may be higher, as there is a gap between log K$_{ow}$ values between 4 and 6.5. Carboxylic acids having a log K$_{ow}$ above 4 tend to have higher molecular weights and are typically solids at room temperature unless they are unsaturated fatty acids. Acids below a log K$_{ow}$ of 2 generally are not hydrophobic enough to return to a biphasic state upon the addition of CO$_2$. Those above a log K$_{ow}$ of 6.5 are too hydrophobic; they either do not achieve the initial monophasic state with the addition of base or do not return to the monophasic state once the CO$_2$ is removed. An effective carboxylic acid would have an intermediate hydrophobicity, allowing for the carboxylic acid to be miscible with a basic aqueous solution but also presenting miscibility low enough that once protonated, a separated acid-phase is obtained.

Interdependence of the Water:Acid Mass Ratio and the Base:Acid Mole Ratio

The base:acid mole ratio required to make a functioning ASHS was expected to be dependent upon the amount of water in the system, but the nature of this dependence was uncertain. To evaluate this, the EHA/NaOH combination was chosen for study (FIG. 4). At almost all water:acid mass ratios, the ASHS showed switchable phase behaviour (♦) only at intermediate base:acid mole ratios. If the amount of base was too low, the system remained biphasic under air (●) but if the amount of base was too large then the addition of 1 bar of CO$_2$ was not sufficient to promote phase separation of the liquid mixture into two liquid phases (▲).

The number of equivalents of base required for switchable phase behaviour is about 0.6 when the water content is low but about 1.0 when the water content is high. This explains why previous researchers, who always used a stoichiometric amount of base, had to use such high water:acid mass ratios. Evidently, decreasing the base:acid mole ratio is the key to eliminating the excessive water consumption of ASHS systems.

In addition, the range of acceptable base:acid mole ratios was shockingly narrow. For some compositions, such as the 2.5:1 H$_2$O:EHA mass ratio, the system presents a switchable behaviour at a 0.65 NaOH:EHA mol ratio, but if this ratio is increased to 0.70 the system remains monophasic after CO$_2$ addition. The narrowness of the range could adversely impact the industrial applicability of the ASHS systems for extractions. In situations where the amount of carboxylic acid cannot be precisely controlled over multiple cycles, the smallest variations in the amount of water or base present could cause the separation to fail.

Fortunately, the use of a small elevated pressure of $CO_2$ dramatically broadens the range of acceptable base:acid mole ratios. For the $EHA:NaOH:H_2O$ ratios to which adding 1 bar of $CO_2$ was not enough to promote separation of the carboxylic acid (▲ in FIG. 4), an increase in the $CO_2$ pressure used was found to be the key to protonating the carboxylate anions and causing phase separation. FIG. 5 shows that successful switchable behaviour was observed upon the addition of 10 bar of $CO_2$ for the $EHA:NaOH:H_2O$ combinations that did not become biphasic upon the addition of only 1 bar of $CO_2$. To facilitate the distinction between the mixtures that successfully switched from monophasic to biphasic, those that switched at 1 bar are shown as filled diamonds (◆), while those that failed to become biphasic at 1 bar but succeeded at 10 bar are shown as hollow diamonds (◇). Thus, slightly elevating the $CO_2$ pressure used during the switching step effectively increases the operating range for the ASHS systems.

In some applications, it might be preferable to widen the range of acceptable base:acid mole ratios without resorting to moderately elevated $CO_2$ pressures. Some alternative strategies to address the issue could include using a different base or a different acid.

To evaluate the impact of other bases on the range of acceptable base:acid mole ratios, the $H_2O:EHA$ system was selected with a 2:1 $H_2O$:acid mass ratio and experiments were performed with KOH, $NH_4OH$ or pyridine instead of NaOH (FIG. 6). The results demonstrated that depending on the base selected, there is a small change in the range in which a successful switchable behaviour is observed. The use of KOH instead of NaOH broadens the successful range. On the other hand, when $NH_4OH$ is used as the base at this particular $H_2O:EHA$ mass ratio, phase switchable behaviour was not observed. On the other hand, tests with pyridine demonstrated that if the base is not strong enough, the initial deprotonation step cannot occur, and the acid remains as a separate phase under air.

The effect of the choice of carboxylic acid was also evaluated. For these tests, once again, a 2:1 $H_2O$:acid mass ratio was selected and NaOH was used as the base. The results obtained with EHA, CPPA, PPA, and hexanoic acid (HEX) are presented in FIG. 7. At this particular $H_2O$:acid mass ratio, EHA and CPPA demonstrated a successful switchable behaviour, but the range was still very narrow and the optimum base:acid ratio depends upon the choice of acid and can readily be determined by the skilled worker in view of the teachings herein.

Toxicity of SHS Systems

The toxicity of the new ASHS is compared to that of previously reported ASHS and CSHS in Table 3. CSHS, especially $CyNMe_2$, have a disadvantage in terms of toxicity, limiting their application for specific processes. The other CSHS shown, N,N-dibutylethanolamine, is better but still more toxic than conventional organic solvents. Separations or extractions requiring the products to be safe for consumption would require a relatively low toxicity solvent. The ASHS using octanoic acid and Jeffamine D-230 is no better than dibutylethanolamine in most respects. The new ASHS presented in this work have less toxicity in part because they do not require an amine. EHA has no GHS warnings other than suspected reproductive toxicity. When EHA is combined with $NaHCO_3$ as the base (or with NaOH as the base after the first cycle), the ASHS combination has no acute toxicity, organic toxicity, aquatic ecotoxicity or corrosive effects. The decreased toxicity of these systems makes them safer to use and compatible with more applications.

Possible Applications of ASHS

The search for low-energy, reliable and scalable methods for polymer recycling is one of the biggest challenges of our times.[70-73] ASHS could be a new method to address this issue. Examples of CSHS being used to recycle polymeric packaging material[49] and prepare artificial latexes[60] have already been reported. In some cases, due to the nature of the polymers being recycled, a surfactant might need to be added to the system to allow for better miscibility of the polymeric particles in the mixture and formation of droplets that facilitate recycling of the polymers. However, there are some issues with the use of CSHS as pointed out by Sui et al.[60] and Samori et al.[49] based on their experiments. These issues are:

(i) the environmental impact caused by the process, which is associated with the energy used in the process and the toxicity of the SHS used;[60]

(ii) the amount of surfactant required;[60]

(iii) the technology readiness of SHS and in comparison to other approaches;[49]

(iv) the discolouration of the polymer due to amine contamination.[74]

Some of these aspects, especially considering discolouration and the toxicity of the SHS, can be addressed by ASHS. Regarding the contamination of the polymer particles with residual SHS, amines tend to oxidise over time. Even small amounts of oxidised amines can change the colouration of mixtures, usually making them yellow.[74] The same is not true for saturated carboxylic acids. As a result, for applications in which polymer discolouration is unacceptable, the ASHS would be a significant improvement over the CSHS.

In the next two sections, two applications of ASHS directed towards polymer recycling are presented.

TABLE 3

| | Comparison among the CSHS and ASHS systems in terms of toxicity (GHS categories)[a] and flashpoint. | | | | | | | | |
|---|---|---|---|---|---|---|---|---|---|
| SHS | ACUTE TOXICITY (ORAL)[B] | ACUTE TOXICITY (INHALATION)[C] | ACUTE TOXICITY (DERMAL)[D] | ORGAN TOXICITY[E] | ACUTE AQUATIC TOXICITY[F] | CHRONIC AQUATIC TOXICITY[G] | REPRODUCTIVE TOXICITY | SKIN IRRITATION[H] | EYE IRRITATION[I] |
| $CyNMe_2$ | 3 | 3 | 3 | | 1 | 2 | | 1B | 1 |
| $Bu_2NCH_2CH_2OH$ | 4 | | 4 | 3 | 3 | 3 | | 1C | 1 |
| Octanoic & D-230 | 4 | | 4 | | 3 | 3 | | 1B | 1 |
| PPA & NaOH | 4 | | | | 3 | | 1B[j] | 1A | 1 |

TABLE 3-continued

Comparison among the CSHS and ASHS systems in terms of toxicity (GHS categories)[a] and flashpoint.

| SHS | ACUTE TOXICITY (ORAL)[B] | ACUTE TOXICITY (INHALA- TION)[C] | ACUTE TOXICITY (DERMAL)[D] | ORGAN TOXICITY[E] | ACUTE AQUATIC TOXICITY[F] | CHRONIC AQUATIC TOXICITY[G] | REPRO- DUCTIVE TOXICITY | SKIN IRRITA- TION[H] | EYE IRRITA- TION[I] |
|---|---|---|---|---|---|---|---|---|---|
| CPPA & NaOH | | | | 3 | 3 | | | 1A | 1 |
| EHA & NaOH | | | | | 3 | | 2[j] | 1A | 1 |
| EHA & NaHCO₃ | | | | | | | 2[j] | | |

For the chemicals without a GHS category, the toxicity was considered very low. In cases of binary mixtures, the score for each type of toxicity is that of the worse actor of the two.

[a]GHS categories assigned based on values obtained from safety data sheets.

[B]Category 3 (H301) means $50 < LD_{50} \leq 300$ mg/kg; category 4 (H302) means $300 < LD_{50} \leq 2000$ mg/kg.

[C]Category 2 (H330) means $0.5 < LC_{50} \leq 2$ mg/L; category 3 (H331) means $2 < LC_{50} \leq 10$ mg/L; category 4 (H332) means $10 < LC_{50} \leq 20$ mg/L.

[D]Category 3 (H311) means $200 < LD_{50} \leq 1000$ mg/kg; category 4 (H312) means $1000 < LD_{50} \leq 2000$ mg/kg.

[E]Specific target organ toxicity, single exposure.

[F]Category 1 (H400) means 96 hr $LC_{50}$ (fish) $\leq 1.0$ mg/L; category 2 (H401) means $1.0 < 96$ hr $LC_{50}$ (fish) $\leq 10$ mg/L; category 3 (H402) means $10 < 96$ hr $LC_{50}$ (fish) $\leq 100$ mg/L; category 4 means no acute toxicity and lack of rapid degradability.

[G]Category 1 (H410) means NOEC or $EC_x \leq 0.01$; category 3 (H412) means $0.1 < NOEC$ or $EC_x \leq 1$.

[H]Category 1B and 1C (H314) causes severe skin burns and eye damage; category 2 (H315) causes skin irritation.

[I]Category 1 (H318) causes serious eye damage; category 2 (H319) causes serious eye irritation.

[j]Reproductive toxicity is suspected

Recycling of Polystyrene Foam

Expanded polystyrene (EPS) foam has become an indispensable polymer in our lives, even though it is notoriously difficult to recycle. EPS has an air content of about 90-95 vol % and a range of densities between 16 and 640 kg m⁻³.⁷⁵ EPS foam is widely used as an insulator, protective material for products during transportation, disposable food containers, and many other applications.[76] However, the non-degradable nature and stable chemical properties of EPS, associated with its large volume, have created environmental issues. The same properties that make EPS a great polymer are also responsible for the pollution and recycling problems of this polymer.[77] Until EPS can be completely replaced with a more environmentally friendly material, improved methods for its recycling are needed.

The proven effectiveness of CSHS for polymer recycling drove us to attempt to recycle EPS with ASHS, with the hope that any residual carboxylic acid in the recovered polymer would be more acceptable than the residual amine. CPPA was therefore used to dissolve EPS packing peanuts (EHA was also tried but gave very poor results under the experimental conditions). Due to the viscosity of the CPPA-EPS mixture, the maximum polymer loading attained was 50 wt %. The mixture was slightly heated (60° C.) for a few hours to facilitate the dissolution of the EPS into the carboxylic acid. During the dissolution, air bubbles trapped in the EPS were released. The addition of water to the CPPA-EPS mixture promoted the precipitation of polymer droplets. In order to recover the polymer, a NaOH aqueous solution was added to the mixture. This resulted in the deprotonation of the carboxylic acid, which then dissolved into the aqueous solution. The insoluble polymer was recovered in the form of a dense powder via filtration. The powder was washed with an additional basic solution (NaHCO₃) and water to remove any CPPA still mixed with the polymer. The total EPS powder recovered was 97 wt % of the initial mass of EPS packing peanuts used. The powder (FIG. 8) could then be processed via extrusion and the polymer reused for other applications. The addition of 15 bar of CO₂ to the aqueous solution allowed for the recovery of the carboxylic acid (93 wt % of total carboxylic acid added), which was converted to its protonated/immiscible form. The ASHS could later be reused to recycle another batch of EPS (FIG. 9).

During polymer recycling, maintaining the physical properties, such as molecular weight and dispersity, of the polymer is crucial. GPC was used to measure the molecular weight distribution of the EPS foam and the EPS particles obtained after the ASHS recycling and extrusion processes. The weight-average molecular weight (Mw) and the dispersity (Đ) of the polymer were virtually identical before (130 kDa, Đ 2.1) and after recycling (129 kDa, Đ 2.1). In addition, thermogravimetric analyses showed that the glass transition temperature of the EPS before recycling (107° C.) and the recovered polystyrene (109° C.) were nearly identical, demonstrating that the polymer retains its properties after recycling. The polymer was able to withstand the treatment with the ASHS solvent and the heating steps involved in the recycling process. These results help demonstrate that the recycling process, in principle, did not degrade the polystyrene.

Removal of Motor Oil from Waste Bottles

Motor oil bottles, once empty, are difficult to recycle because the plastic and the residual oil must be separated, but ASHS may facilitate this separation and recycling without use of VOS. These bottles generated about 150 000 tonnes of high-density polyethylene (HDPE) waste contaminated with more than 20 million gallons of residual oil per year.[78] This waste causes environmental issues such as soil and groundwater contamination with oil.[78, 79] Conventional washing of the bottles is inefficient since the motor oil has low miscibility with water, and organic solvent washes would require a distillation step in addition to causing other environmental issues. The ASHS carboxylic acids in their neutral state are hydrophobic and, therefore, suitable solvents to extract the motor oil from the used bottles. After the extraction, the switchable properties of the ASHS would allow it to be washed out of the motor oil by a basic aqueous solution. Finally, the addition of CO₂ to the aqueous washings would promote the recovery of the solvent, which could then be used for recycling another batch of oil bottles (FIG. 10). Ideally, the recovered motor oil could be obtained without contamination with carboxylic acid, base or water and, because it is unused oil, would be much easier to recycle than used motor oil.

Experiments were carried out using EHA as the carboxylic acid to remove the motor oil. An oil-contaminated bottle was cut up, and the pieces were washed with the ASHS (FIG. 10). For comparison, the same extraction process was also performed using hexanes as the extraction solvent, which allowed us to compare the extraction efficiency of the ASHS with a typical VOS. The bottle pieces after being washed with the ASHS were rinsed with an aqueous NaOH solution (0.63 mol NaOH per mol of EHA, 2.5 g water per g of EHA). By using the aqueous solution to rinse the bottle pieces before mixing the aqueous solution with the acid-oil mixture, one can ensure that any EHA still on the surface of the plastic pieces is also recovered. The bottle pieces were filtered from the aqueous solution and left to dry under air overnight. The pieces were then washed with $CDCl_3$, and a $^1$H NMR spectrum was obtained. Neither mineral oil nor EHA could be detected in the NMR spectrum. The aqueous base solution was then combined with the acid-oil mixture, and the motor oil was recovered via centrifugation and analysed via $^1$H NMR spectroscopy. The aqueous mixture was then exposed to 10 bar of $CO_2$, and partial recovery of EHA was achieved. The recovered EHA was mixed with some fresh EHA (to account for the mass loss to the aqueous solution) and used in a second extraction cycle with extra bottle pieces contaminated with motor oil. The processes performed in the first extraction were repeated in this second extraction using a freshly prepared aqueous base solution.

The extent of recovery of the carboxylic acid is crucial for industrial application. In this small scale experiment, after the first cycle, 73% of the initial amount of EHA was recovered. The loss of some EHA is presumably due to a) EHA remaining in the oil, and b) EHA remaining in the aqueous phase due to incomplete protonation and/or partial solubility of the neutral form. The recovered EHA was mixed with fresh EHA, so a second extraction of motor oil from other contaminated pieces could be performed. In this second cycle, the EHA-rich phase recovered was around 90% of the original mass of EHA. As in the first cycle, the EHA-rich phase was contaminated with water. That was confirmed by Karl-Fisher titration. Subtracting the water content of the EHA-rich phase, the recovery of EHA in the $2^{nd}$ cycle was 77%. The overall EHA recovery over the two cycles was 59%. Although the recovery was incomplete, the carboxylic acid in the aqueous phase can still be reused. To achieve this, instead of using a fresh aqueous basic solution, the aqueous solution obtained after the first washing cycle can be reused. It is expected that by reusing the aqueous solution, the recovery of carboxylic acid in the second cycle will be considerably increased. As a result, the overall loss of carboxylic acid per cycle will be substantially reduced and only be attributed to the carboxylic acid in the recovered motor oil.

The above tests showed that the ASHS was able to remove the motor oil from the bottle pieces as efficiently as a VOS. The oil recovered was analysed via 1H NMR spectroscopy (FIG. 14); there was still a small amount of EHA detectable in the oil. However, washing the recovered oil with aqueous $NaHCO_3$ removed residual acid to below the $^1$H NMR detection limit.

Conclusions

Shifting from processes that rely on volatile organic solvents (VOS) is paramount if more environmentally friendly industrial processes are to be attained. VOS have been widely used and are quite efficient in the conversions and separations that make use of their properties. However, there are many concerns regarding their toxicity, flammability and overall negative environmental impact. Switchable-hydrophilicity solvents (SHS) potentially present a more environmentally friendly alternative to VOS, because SHS can be used, removed, and recycled without any distillation step and therefore do not need to be volatile. All previously published examples of SHS contained amines, which posed toxicity and discolouration problems. In addition, all of the previously reported ASHS required a large excess of water, had significant ecotoxicity concerns, and acted as surfactants in that they stabilised unwanted foams and emulsions.

Herein are disclosed ASHS that are amine-free, do not require a large excess of water, do not act as surfactants, and present much less risk in terms of toxicity, aquatic ecotoxicity, and damage to skin or the eyes. The efficiency of the ASHS systems was directly linked to the base:acid and water:acid ratios. It was possible to prepare combinations that had switchable behaviour when substoichiometric amounts of NaOH were added to the system. In addition, the water:acid ratio was considerably reduced from 9.5:1 to 2.5:1 in some cases. These improvements are vital if ASHS are to be exploited for applications on larger scales.

The effectiveness of carboxylic acid-NaOH pairs as ASHS has been demonstrated herein. While the range in which particular acid:base:water combinations presented a switchable behaviour was very narrow, the use of small elevated pressures of $CO_2$, such as 5 or 10 bar, solves this issue and is likely to be economically acceptable to industry.

Two example applications have been demonstrated. Using the CPPA/NaOH combination, it was possible to recycle EPS foam. The most remarkable change was the decrease in volume. In addition, as confirmed by NMR and ATR-FTIR, after the additional washes of the EPS powder with $NaHCO_3$, no contamination by CPPA was detected. In addition, the polymer retained its properties (Mw and D) after the recycling and extrusion processes.

The preliminary experiments carried out with EHA to remove motor oil from used bottles demonstrated the ASHS extraction. EHA was demonstrated to be as efficient as hexanes to extract the oil from the bottles. While there were issues when trying to recover the EHA from the aqueous solution after the addition of $CO_2$ (even though high pressures of $CO_2$ were employed, the total EHA recovery after two cycles was only 59% based on all the EHA added during the extractions), it is believed that this issue can be addressed if the basic aqueous solution obtained after the first cycle is reused.

This study demonstrated the effectiveness of ASHS systems as viable replacements for VOS. By combining hydrophobic branched and cyclic carboxylic acids with substoichiometric amounts of inorganic bases, systems have been created that required less water than previous published ASHS systems. In addition, the ASHS explored here addressed the ecotoxicity concerns observed to previously published CSHS and ASHS. The successful application of the ASHS to recycle EPS and HDPE bottles contaminated with motor oil has also been demonstrated. By using slightly higher pressures of $CO_2$ (10-15 bar), it was possible to substantially improve the range of compositions in which the ASHS were effective, ensuring high recovery of the carboxylic acids used. The systems presented here can still be further optimised, so that ASHS systems can be employed on a large scale in the future and be a low-volatility replacement for VOS.

Experimental Procedures and Supplementary Information

S1. Experimental Methods and Materials

Chemicals were used as received. The following materials were obtained from commercial sources (Sigma-Aldrich, Fisher): 2-ethylhexanoic acid (EHA), 2-propylpentanoic acid (PPA), 3-cyclopentylpropionic acid (CPPA), octanoic acid (OA), oleic acid (OLA), linoleic acid (LA), 2-hexyldecanoic acid (HAD), 10-undecenoic acid (UA), nonanoic acid (NA), 2-phenylpropionic acid (PHPA), hexanoic acid (HA), 2-methylbutyric acid (MBA), isobutyric acid (IBA), triethanolamine (TEA), N-methyldiethanolamine (MDEA), N,N-dimethylethanolamine (DMEA), 3-dimethylamino-1-propanol (3-DMAP), polyoxypropylenediamine (Jeffamine D-230), sodium hydroxide, potassium hydroxide, ammonium hydroxide, pyridine and sodium dodecyl sulphate (SDS). Solvents used were: hexanes and tetrahydrofuran (THF). Water with a conductivity of 18.2 MO before exposure to air was obtained from a Milli-Q® purification system (Synergy UV). Gum mastic was obtained from Sigma.

For the $^1$H NMR (Bruker spectrometer) spectroscopy, either $C_6D_6$ or $CDCl_3$ (Cambridge Isotope Laboratories) were used as the solvent.

S1.1. Evaluation of the Switching Behaviour of ASHS Systems

Base solutions were prepared by combining the desired base and water (mass for components measured in an analytical scale) into either a 10 or 25 mL graduated cylinder (containing a magnetic stir bar) depending on the final volume of the mixture obtained. The carboxylic acid (mass measured using an analytical balance prior to addition) being studied was added to the base solution, and the mixture was mixed with the help of a magnetic stir plate. The amount of base and water used were selected based on the acid:base:water ratio desired. Experiments were carried out using stoichiometric and substoichiometric amounts of the base relative to the number of mols of acid added. In addition, the quantity of water used was adjusted based on the acid:water mass ratio desired. A typical experiment would contain 1 g of the carboxylic acid; between 0.4 and 1 mol of base per mol of acid; and a water mass varying from 1 to 9.5 g.

After the components of the mixture were properly mixed (approximately 5 min of stirring), the pH of the monophasic mixture was measured and recorded using a semi-micro pH probe (Thermo Scientific model 9103BNWP) attached to a pH meter (Thermo—Orion Star Series). The stir bar was removed, and the solution was then slowly bubbled (no evaporation was visually noticed) with $CO_2$ (bone dry 3.0, 99.9%) via a sparge tube (ace gas dispersion tube with porous fritted glass tip Fit #7 Ace-Thred, O.D.×L 7 mm×135 mm, porosity 145-174 μm). During a typical experiment, $CO_2$ would be added for approximately 2 h at atmospheric pressure. At the end of the 2 h, the sparge tube would be removed, and the number and volume of the phases obtained would be recorded. The pH was once again recorded. For mixtures with only 1 phase, the pH of that phase was recorded. While for mixtures with 2 phases, the pH of the aqueous phase was recorded. Loss of volume due to evaporation was not significantly noticeable.

In the systems in which the base:acid mole ratio and the water:acid mass ratio were being studied, a slight modification from this method was used. The acid being tested (1 g) was mixed with 1 g of water and the required amount of NaOH (based on the acid:base molar ratio desired) to prepare the mixture. To mixtures that were initially biphasic under air, water was added dropwise under agitation (using a magnetic stir plate). These systems remained biphasic under air, and this behaviour was highlighted in the graphs prepared.

For the tests with different carboxylic acids and the fixed 1:2 mass ratio of carboxylic acid:$H_2O$, the carboxylic acid:base ratio was determined for each sample, the required mass of NaOH was weighed in an analytical balance and solubilised with the appropriate mass of $H_2O$. The base solution was then added to the carboxylic acid, and the next steps followed the procedure previously described.

During the experiments where EHA was mixed with different bases, the EHA:$H_2O$ mass ratio was fixed at 1:2. The EHA:base ratio was determined for each sample, the required mass of NaOH, KOH or pyridine was weighed in an analytical balance and solubilised with the appropriate mass of $H_2O$. For the systems containing $NH_4OH$, a 30 wt % solution in water (obtained from Sigma) was used instead, and additional water was added to achieve the 1:2 EHA:$H_2O$ mass ratio. The base solution was then added to the carboxylic acid, and the next steps followed the procedure previously described.

S1.2. Evaluation of the Switching Behaviour of ASHS Systems Under Elevated Pressures of $CO_2$ The base (NaOH), water and acid (2-ethylhexanoic acid (EHA)) mixtures were prepared following the same procedure previously described. After obtaining the pH of the mixture prior to the addition of $CO_2$, the solutions were transferred to a high-pressure liquid level sight gauge (hereafter referred to as the "sight gauge") manufactured by Inferno Manufacturing Co. (modified 11A-TL-B model, T316 stainless steel, with a pressure rating of 345 bar at 38° C., 36.5 mL internal volume), equipped with a stainless steel dip-tube. The sight gauge was kept at a constant temperature (20° C.) in a water bath. The solutions were maintained under stirring due to a magnetic stir bar controlled by a magnetic stir plate. To maximize the stirring, the vessel was placed on its side (horizontal position).

The mixture was then pressurized to 10 bar of $CO_2$ in the sight gauge. In order to determine the volume of the phases obtained, measurements of the height of the water-rich and the carboxylic acid phase were obtained using a cathetometer while the vessel was in a vertical position. The relationship between height and internal volume on the sight gauge is known. The vessel was then slowly depressurized. The phases were collected using a glass pipette.

S1.3. Recovery of Polystyrene from Polystyrene Foam

In a typical experiment, 1.0 g chunks of polystyrene (PS) foam packing material (Uline Peanuts S-1128 white antistatic) were weighted in a beaker, and 2.5 g (0.017 mol, 2.5 mL) of 3-cyclopentylpropionic acid (CPPA) was added to the chunks. The beaker was placed in an oven at 60° C. to dissolve the foam. After dissolution was complete, the mixture was cooled down to room temperature (23±1° C.), a magnetic stir bar was added, and the mixture was stirred at 450 rpm. To this mixture, 5.0 g of water was slowly added using a syringe. The addition of water before adding the base solution allowed the polymer to precipitate as a powder at the end of the process. In a separate vial, 0.45 g of NaOH flakes were added to 1.25 g of water. The mixture was cooled down with the help of an ice bath. Once at room temperature, the base solution was dripped into the polystyrene mixture. After the complete addition of the base solution, the pH of the mixture was measured using the same pH probe/meter previously described. The new mixture was stirred for 2 h (using a stir plate).

After the 2 h of stirring, the styrofoam precipitated polystyrene powder was collected by filtration. To remove any remaining acid in the polystyrene, the powder was washed 3× with a saturated sodium bicarbonate aqueous solution (3×100 mL washes) and DI water and finally air-dried.

The dry powder was submitted to double-screw extrusion in order to prepared pellets from the recovered styrofoam. The procedure was carried out at 150° C. at 100 rpm with 1 min retention time into the chamber (Micro 5CC Twin Screw Compounder, DSM Research Netherlands).

The original polystyrene foam and the extruded polystyrene were characterized by gel permeation chromatography (GPC). The GPC analyses were performed using tetrahydrofuran (THF) as the eluent. Samples at a 4 mg/mL concentration in THF were passed through a 0.2 μm filter prior to injection. The samples were analyzed on a Waters 2695 separation module equipped with a Waters 410 differential refractometer and Waters Styragel HR (4.6×300 mm) 4, 3, 1 and 0.5 separation columns at 32° C. and 1 mL/min flow rate. The GPC was calibrated using PS monodisperse standards.

The PS foam, the recovered PS and the PS pellets were characterized via $^1$H NMR and ATR-FTIR. $^1$H NMR spectra were recorded at 298 K with a Bruker Advance 400.30 MHz NMR spectrometer using $d_6$-$C_6D_6$ as the solvent. ATR-FTIR spectra were measured using a Bruker ALPHA FT-IT Spectrometer with attenuated total reflectance (ATR) sampling module.

S1.4. Removal of Motor Oil from Contaminated Bottles

A 10DW30 motor oil bottle was emptied by pouring the oil until flow ceased, but without any rinsing, and the bottle was cut into small (1 cm$^2$) pieces. The pieces still contaminated with the motor oil were transferred to a glass vial. A typical experiment used 2.0 g of bottle pieces. To the vial containing the pieces, approximately 3.0 g of the extraction solvent (either hexanes or 2-ethylhexanoic acid (EHA)) was added. To this mixture, a magnetic stir bar was added, and the mixture was stirred at 500 rpm for 1 h. After that time, the solvent was recovered with a glass pipette, its mass was measured, and the solvent was set aside for the next steps. To the vial containing the pieces, an additional 3 g of fresh extraction solvent was added, and the mixture was once again left under stirring for 1 h. After that time, the solvent was once again recovered and the mass measured. The two solvent fractions were combined.

The bottle pieces which were in contact with the hexanes were left to air dry. The hexanes/motor oil mixture recovered from the bottle pieces was also left under air (24 h) to allow the hexanes to evaporate, and the mass of oil removed from the bottle pieces was measured.

The bottle pieces which had been washed with EHA were then washed with a NaOH aqueous solution. This base solution contained 0.63 mol of NaOH for every mole of EHA that had been used, and 2.5 g of water for every gram of EHA that had been used. Next, the base solution was recovered using a glass pipette and mixed with the recovered EHA/motor oil mixture. The NaOH:EHA mixture was stirred for 30 min, after which the pH was measured using the same pH meter and probe previously described. After that, the mixture was centrifuged (Thermo Scientific IEC Medilite Microcentrifuge) at 3100 rpm for 15 min. After that time, the motor oil fraction was collected and the mass measured to determine the recovery. The recovered motor oil was analyzed to identify any carboxylic acid contamination via $^1$H NMR spectroscopy (Bruker 300.13 MHz spectrometer) using CDCl$_3$ as solvent and ethanol (99.9%) as internal standard. To remove any remaining acid in the motor oil, the oil was washed 3× with a saturated sodium bicarbonate aqueous solution (3×10 mL washes). And the oil was analyzed via $^1$H NMR spectroscopy (Bruker 300.13 MHz spectrometer) using CDCl$_3$ as solvent.

The aqueous phase containing the deprotonated carboxylic acid was transferred to the sight gauge and pressurized to 10 bar. This reprotonated the carboxylic acid and caused it to form a separate organic liquid phase, which was recovered and weighed. The carboxylic acid was analyzed via $^1$H NMR spectroscopy (Bruker 300.13 MHz spectrometer) to determine whether it contained any water or leftover oil. CDCl$_3$ was used as solvent and ethanol (99.9%) as internal standard. The aqueous solution obtained after the addition of CO$_2$ was discarded. The recovered EHA was mixed with fresh EHA (to account for the mass loss to the aqueous solution) and used in a second extraction cycle with extra bottle pieces contaminated with motor oil. The processes performed in the first extraction were repeated to this second extraction. The EHA was once again recovered by adding a fresh mixture aqueous of NaOH and pressurizing the aqueous solution to 10 bar of CO$_2$. The mass of EHA recovered was measured and used to determine the overall recovery after the extractions.

S2. Additional Data for the Carboxylic Acid:NaOH:H$_2$O Systems Presented in FIG. 3

Additional data for the carboxylic acid:NaOH:H$_2$O systems presented in FIG. 3 is presented herein. Included below are the mole ratio between carboxylic acid:NaOH and the mass ratio between carboxylic acid:H$_2$O that resulted in the exhibited behaviours.

TABLE 4

Additional data for the ASHS presented in FIG. 3. The carboxylic acid:H$_2$O mass ratio, the carboxylic acid:NaOH mol ratio and the behaviour of the systems under these conditions is presented.

| ASHS | Carboxylic acid:H$_2$O mass ratio | Carboxylic acid:NaOH mol ratio | Behaviour of the system |
|---|---|---|---|
| 2-ethylhexanoic acid | 1:2.5 | 1:0.6 | Switchable |
| 2-hexyldecanoic acid | 1:12 | 1:1 | Biphasic under air |
| 2-methylbutyric acid | 1:2.5 | 1:0.5-1:1 | Biphasic under air |
| 2-phenylpropionic acid | 1:2.5 | 1:0.5 and 1:0.6 | Monophasic under 1 bar of CO$_2$ |
| 2-propylpentanoic acid | 1:2.5 | 1:0.8 | Switchable |
| 3-cyclopentylpropionic acid | 1:2.5 | 1:0.8 | Switchable |
| 10-undecenoic acid | 1:2.5 | 1:1 | Switchable |
| Hexanoic acid | 2:1 | 1:0.6 | Monophasic under 1 bar of CO$_2$ |
| Isobutyric acid | 1:2.5 | 1:0.6 | Monophasic under 1 bar of CO$_2$ |

TABLE 4-continued

Additional data for the ASHS presented in FIG. 3. The carboxylic
acid:H$_2$O mass ratio, the carboxylic acid:NaOH mol ratio and the
behaviour of the systems under these conditions is presented.

| ASHS | Carboxylic acid:H$_2$O mass ratio | Carboxylic acid:NaOH mol ratio | Behaviour of the system |
|---|---|---|---|
| Linoleic acid | 1:5 | 1:1 | Biphasic under air |
| Nonanoic acid | 1:2.5 | 1:0.7 | Switchable |
| Octanoic acid | 1:1.5 and 1:2.5 | 1:0.9 | Switchable |
| Oleic acid | 1:10 | 1:1 | Biphasic under air |

S3. Additional Data for the EHA:NaOH:H$_2$O Systems

FIG. 4 is presented with the pH obtained for the mixtures prior to the addition of CO$_2$.

The pH of some of the EHA:NaOH:H$_2$O mixtures was also obtained before the addition of CO$_2$ (FIG. 11). The goal was to determine if there was a dependency of the switchable behaviour in regards to the pH of the solution. If that was to be the case, instead of having to prepare solutions with precise ratios, the pH of the solution under air could serve as an indication to predict the behaviour of the system. Unfortunately, as the data presented demonstrated, no correlation between the pH and a switchable behaviour was observed under the experimental conditions. For example, the sample with the 0.8:1 NaOH:EHA mole ratio and 3:1 H$_2$O:EHA mass ratio which did not present a switchable behaviour had the same pH (7.2) as the sample with a 0.9:1 NaOH:EHA mole ratio and 5:1 H$_2$O:EHA mass ratio, which presented a switchable behaviour. Similar behaviour was observed for other mixtures tested. However, when comparing the pH of samples with the same EHA:NaOH mol ratio, it was observed that with an increase in the amount of water added to the system, there is a decrease in the pH observed under air. For the samples with NaOH:EHA mole ratio of 0.9:1, the samples with H$_2$O:EHA mass ratio from 1:1 to 3:1 do not present a switchable behaviour under 1 bar of CO$_2$, and the pH varies from 7.5 to 7.2 respectively. For the sample with a 4:1 mass ratio, the pH observed was 7.1. Once extra water is added, the systems become biphasic under air, and the pH decreases from 7.1 to 6.6. These results might indicate a threshold pH in which the aqueous solution becomes too acidic (because the NaOH is being diluted), and the carboxylic is not deprotonated by the base under air. Without being bound by theory, the preliminary data suggests a correlation of the behaviour of the system, at least when the same EHA:NaOH mol ratio is maintained.

S4. Additional Data for the Recycling of Polystyrene Foam

During the recycling of polymers using CSHS, one of the issues faced was the contamination of the polymer obtained with the solvent; this was not an issue for the ASHS tested. FIG. 12 shows the $^1$H NMR spectra obtained for the initial EPS foam (a), the recovered EPS powder after treatment with CPPA (b) and the polymer obtained after extrusion (c). As FIGS. 12*b* and 12*c* show, no peaks associated with CPPA were detected. This demonstrates that the addition of the aqueous solution of NaOH and subsequent rinsing cycles of the EPS powder with the NaHCO$_3$ solution successfully removed the residual CPPA below the detection limit of NMR spectroscopy. Aiming to confirm the importance of the NaHCO$_3$ washes, ATR-FTIR spectra were obtained for the original EPS foam, the recovered polystyrene powder after treatment with the NaOH aqueous solution; and the powder after rinsing with the sodium bicarbonate solution to remove residual CPPA (FIG. 13).

The peak at 1719 cm$^{-1}$ is associated with the presence of a carbonyl stretch in the CPPA solvent. This peak is still present in the EPS powder, even after the CPPA solvent was deprotonated by the addition of the NaOH aqueous solution but not after the powder was further washed with a NaHCO$_3$ aqueous solution. As evidenced by the FTIR spectra presented in FIG. 13, even after a first rinsing cycle, the peak at 1719 cm$^{-1}$ completely disappears, indicating that the CPPA contaminating the EPS powder was deprotonated and washed out by the basic bicarbonate solution. The rinsing solution could potentially be treated to recover the CPPA dissolved on it in order to maximise the CPPA recovery.

EHA was also tested as a possible solvent to dissolve the EPS foam. Different from CPPA, when EHA was mixed with the EPS foam, a very viscous mixture was obtained. The maximum EPS loading that could be attained and still allow for the next steps to occur was 5 wt %. In addition, the dissolution of the EPS into EHA was slower, and upon heating, the solution attained a rubber-like consistency which impeded the continuation of the process. Upon addition of the NaOH solution to this rubbery mixture, the polymer does not precipitate. Instead, an oil with a lower density than the aqueous solution is formed. For these reasons, EHA was ruled out as a possible solvent for this specific application.

S5. Additional Data for the Recovery of Motor Oil from Used Bottles

The ASHS was able to remove the motor oil from the bottle pieces as efficiently as a VOS; however, the oil recovered was still contaminated by EHA. NMR spectra were obtained for the oil recovered with the ASHS. As can be seen, the $^1$H NMR (FIG. 14) shows that the oil recovered was still contaminated by a small amount of EHA. The spectrum obtained for the recovered oil still presented peaks from EHA around 5.40 ppm, 2.10 ppm and overlapping with the motor oil peaks. Aiming to quantify the amount of EHA still mixed with the oil recovered, an internal standard was added to the mixture (EtOH); however, due to the overlap in the peaks for the oil and EHA, quantification was not possible. To address this issue, the oil recovered was washed with a saturated solution of NaHCO$_3$ (3×10 mL). After that, the oil was recovered and analysed via $^1$H NMR. As can be seen, after the washes, there are no peaks associated with EHA, demonstrating that the washing procedure was efficient to remove any carboxylic acid remaining in the oil.

REFERENCES

1 S. Reimann and A. C. Lewis, in *Volatile Organic Compounds in the Atmosphere*, 2007, DOI: https://doi.org/10.1002/9780470988657.ch2, pp. 33-81.
2. D. Stoye, W. Funke, L. Hoppe, J. Hasselkus, L. G. Curtis, K. Hoehne, H.-J. Zech, P. Heiling, M. Yamabe, K. Doren, H. Schupp, R. KUchenmeister, M. Schmitthenner, W. Kremer, W. Wieczorrek, H. Gempeler, W. Schneider, J. W. White, A. G. Short, W. J. Blank, L. J. Calbo, D. Plath, F. Wagner, W. Haller, K.-M. Rudder, H.-J. Streitberger, E. Urbano, R. Laible, B. D. Meyer, E. Bagda, F. A. Waite, M. Philips, K. Kohler, P. Simmendinger, W. Roelle, W. Scholz, A. Valet, M. Slongo, T. Molz, R. Hiller, K. W. Thomer, K. Vogel, U. Schernau, B. Hüser, A. Brandt, A. Milne, H. Weyers, W. Plehn and H.-A. Lentze, in *Ullmann's Encyclopedia of Industrial Chemistry*, DOI: https://doi.org/10.1002/14356007.a18_359.pub2.

3. A. M. Yeoman and A. C. Lewis, *Elementa: Science of the Anthropocene*, 2021, 9.

4. US Environmental Protection Agency, Technical Overview of Volatile Organic Compounds, https://www.epa.gov/indoor-air-quality-iaq/technical-overview-volatile-organic-compounds, 2021).

5. Minnesota Department of Health, Volatile Organic Compounds in Your Home, https://www.health.state.mn.us/communities/environment/air/toxins/voc.htm, 2021).

6. A. P. Altshuller, *Atmospheric Environment* (1967), 1983, 17, 2131-2165.

7. H. Rodhe, *Science*, 1990, 248, 1217.

8. B. J. Finlayson-Pitts and J. N. Pitts, *Science*, 1997, 276, 1045.

9. M. Kampa and E. Castanas, *Environmental Pollution*, 2008, 151, 362-367.

10. M. A. Bari and W. B. Kindzierski, *Science of The Total Environment*, 2018, 631-632, 627-640.

11. M. S. Kamal, S. A. Razzak and M. M. Hossain, *Atmospheric Environment*, 2016, 140, 117-134.

12. X. Lu, J. Hong, L. Zhang, 0. R. Cooper, M. G. Schultz, X. Xu, T. Wang, M. Gao, Y. Zhao and Y. Zhang, *Environmental Science & Technology Letters*, 2018, 5, 487-494.

13. US Environmental Protection Agency, Volatile Organic Compounds' Impact on Indoor Air Quality, https://www.epa.gov/indoor-air-quality-iaq/volatile-organic-compounds-impact-indoor-air-quality, 2021).

14. M. Poliakoff, J. M. Fitzpatrick, T. R. Farren and P. T. Anastas, *Science*, 2002, 297, 807.

15. J. M. DeSimone, *Science*, 2002, 297, 799.

16. Canadian Environmental Protection Act, *Renewal of the Federal Agenda on the Reduction of Volatile Organic Compound (VOC) Emissions from Consumer and Commercial Products for the 2021 to 2028 period: discussion paper*, https://www.canada.ca/en/environment-climate-change/services/canadian-environmental-protection-act-registry/federal-agenda-volatile-organic-compound-discussion-paper.html, 2021.

17. Council of the European Union and European Parliament, *Directive 2004/42/CE of the European Parliament and of the Council of 21 Apr. 2004 on the limitation of emissions of volatile organic compounds due to the use of organic solvents in certain paints and varnishes and vehicle refinishing products and amending Directive 1999/13/EC*, 2004, 143, 87-96.

18. M. Amann and M. Lutz, *Journal of Hazardous Materials*, 2000, 78, 41-62.

19. Z. Chen, J.-N. Wang, G.-X. Ma and Y.-S. Zhang, *The Lancet*, 2013, 382, 1959-1960.

20. US Environmental Protection Agency, 40 CFR Part 59—*National Volatile Organic Compound Emission Standards for Consumer and Commercial Products*, 1996, 61, 14531-14543.

21. Senate and House of Representatives of the United States of America, *Provisions for Attainment and Maintenance of National Ambient Air Quality Standards*, 1990, 101, 2399-2712.

22. Courier Journal, '*I saw a flash—and the house shook like paper': The day Louisville's sewers exploded*, 1981. Published online: Feb. 22, 2018, https://www.courier-journal.com/story/news/local/2018/02/22/kentucky-history-louisville-sewer-explosion-1981/364026002.

23. BioFuels Journal, Second AGP Worker Dies from August Explosion at Sergeant Bluffs, IA Facility, Published online: Oct. 20, 2003, https://www.biofuelsjournal.com/articles/second_agp_worker_dies_from_august_explosion_at_sergeant_bluffs_ia_facility-20448.html.

24. ARIA, *Explosion of a VOC recovery pipeline at a petrochemical plant*, 2011, 59. Available online via https://www.aria.developpement-durable.gouv.fr/wp-content/files_mf/A41142_ips41142_002.pdf.

25. P. Kinnersley, *What really happened at Flixborough?*, New Scientist Magazine, 1975, 65 (938), p. 520-522.

26. B. Huang, C. Lei, C. Wei and G. Zeng, *Environment International*, 2014, 71, 118-138.

27. P. T. Anastas, *Handbook of green chemistry. Green solvents*, Wiley-VCH [Germany]; Weinheim, 2009.

28. P. T. Anastas and J. C. Warner, *Green chemistry: theory and practice*, Oxford University Press, Oxford [England]; New York, 1998.

29. C.-J. Li and B. M. Trost, *Proceedings of the National Academy of Sciences*, 2008, 105, 13197.

30. C. Capello, U. Fischer and K. Hungerbühler, *Green Chemistry*, 2007, 9, 927-934.

31. J. H. Clark and S. J. Tavener, *Organic Process Research & Development*, 2007, 11, 149-155.

32. P. G. Jessop, *Green Chemistry*, 2011, 13, 1391-1398.

33. L. J. Diorazio, D. R. J. Hose and N. K. Adlington, *Organic Process Research & Development*, 2016, 20, 760-773.

34. U. M. Lindstrom, *Organic Reactions in Water: Principles, Strategies and Applications*, Wiley, 2008.

35. C.-J. Li and L. Chen, *Chemical Society Reviews*, 2006, 35, 68-82.

36. International Energy Agency, *Technology Roadmap: Energy and GHG Reductions in the Chemical Industry via Catalytic Processes*, 2013.

37. F. Sahena, I. S. M. Zaidul, S. Jinap, A. A. Karim, K. A. Abbas, N. A. N. Norulaini and A. K. M. Omar, *Journal of Food Engineering*, 2009, 95, 240-253.

38. A. I. Cooper, *Advanced Materials*, 2001, 13, 1111-1114.

39. R. B. Gupta and J.-J. Shim, *Solubility in supercritical carbon dioxide*, CRC Press, Boca Raton, 2007.

40. E. L. Smith, A. P. Abbott and K. S. Ryder, *Chemical Reviews*, 2014, 114, 11060-11082.

41. A. Paiva, R. Craveiro, I. Aroso, M. Martins, R. L. Reis and A. R. C. Duarte, *ACS Sustainable Chemistry & Engineering*, 2014, 2, 1063-1071.

42. Q. Zhang, K. De Oliveira Vigier, S. Royer and F. Jérôme, *Chemical Society Reviews*, 2012, 41, 7108-7146.

43. D. J. Heldebrant, H. N. Witt, S. M. Walsh, T. Ellis, J. Rauscher and P. G. Jessop, *Green Chemistry*, 2006, 8, 807-815.

44. D. J. Heldebrant and P. G. Jessop, *Journal of the American Chemical Society*, 2003, 125, 5600-5601.

45. P. G. Jessop, L. Kozycz, Z. G. Rahami, D. Schoenmakers, A. R. Boyd, D. Wechsler and A. M. Holland, *Green Chemistry*, 2011, 13, 619-623.

43

46. J. Durelle, J. R. Vanderveen, Y. Quan, C. B. Chalifoux, J. E. Kostin and P. G. Jessop, *Physical Chemistry Chemical Physics,* 2015, 17, 5308-5313.

47. J. R. Vanderveen, J. Geng, S. Zhang and P. G. Jessop, *RSC Advances,* 2018, 8, 27318-27325.

48. S. Han, M. Ramezani, P. TomHon, K. Abdel-Latif, R. W. Epps, T. Theis and M. Abolhasani, *Green Chemistry,* 2021, 23, 2900-2906.

49. C. Samori, D. Cespi, P. Blair, P. Galletti, D. Malferrari, F. Passarini, I. Vassura and E. Tagliavini, *Green Chemistry,* 2017, 19, 1714-1720.

50. S. D. Yook, J. Kim, H. M. Woo, Y. Urn and S.-M. Lee, *Renewable Energy,* 2019, 132, 61-67.

51. G. Lasarte-Aragonés, R. Lucena, S. Cárdenas and M. Valcárcel, *J Sep Sci,* 2015, 38, 990-995.

52. B. B. Asare Bediako, P. Zhou, B. Rugabirwa, Q. Liu, Y. Su, H. Wang and J. Li, *Advanced Powder Technology,* 2019, 30, 565-571.

53. A. Cicci, G. Sed, P. G. Jessop and M. Bravi, *Green Chemistry,* 2018, 20, 3908-3911.

54. J. GroBeheilmann, J. R. Vanderveen, P. G. Jessop and U. Kragl, *ChemSusChem,* 2016, 9, 696-702.

55. D. Fu, S. Farag, J. Chaouki and P. G. Jessop, *Bioresource Technology,* 2014, 154, 101-108.

56. A. R. Boyd, P. Champagne, P. J. McGinn, K. M. MacDougall, J. E. Melanson and P. G. Jessop, *Bioresource Technology,* 2012, 118, 628-632.

57. P. G. Jessop, L. Phan, A. Carrier, S. Robinson, C. J. Dürr and J. R. Harjani, *Green Chemistry,* 2010, 12, 809-814.

58. Q. Chen, L. Wang, G. Ren, Q. Liu, Z. Xu and D. Sun, *Journal of Colloid and Interface Science,* 2017, 504, 645-651.

59. World Pat., WO2011050469A1, 2011.

60. X. Su, P. G. Jessop and M. F. Cunningham, *Green Chemistry,* 2017, 19, 1889-1894.

61. G. Sed, A. Cicci, P. G. Jessop and M. Bravi, *RSC Advances,* 2018, 8, 37092-37097.

62. L. Phan, H. Brown, J. White, A. Hodgson and P. G. Jessop, *Green Chemistry,* 2009, 11, 53-59.

63. J. R. Vanderveen, J. Durelle and P. G. Jessop, *Green Chemistry,* 2014, 16, 1187-1197.

64. A. K. Alshamrani, J. R. Vanderveen and P. G. Jessop, *Physical Chemistry Chemical Physics,* 2016, 18, 19276-19288.

65. W. Yue, Z. Huang, M. Xiao, X. Li, W. Ma, Y. Zhang, S. Dai and H. Lu, *Industrial & Engineering Chemistry Research,* 2021, DOI: 10.1021/acs.iecr.1c04122.

66. E. Ceschia, J. R. Harjani, C. Liang, Z. Ghoshouni, T. Andrea, R. S. Brown and P. G. Jessop, *RSC Advances,* 2014, 4, 4638-4645.

67. I. T. Cunha, H. Yang and P. G. Jessop, *Green Chemistry,* 2021, 23, 3996-4007.

68. P. G. Jessop and M. F. Cunningham, *CO2-switchable Materials: Solvents, Surfactants, Solutes and Solids,* Royal Society of Chemistry, 2020.

69. D. L. Weaire and S. Hutzler, *The physics of foams,* Clarendon Press, Oxford, 1999.

70. K. Hamad, M. Kaseem and F. Deri, *Polymer Degradation and Stability,* 2013, 98, 2801-2812.

71. G. W. Coates and Y. D. Y. L. Getzler, *Nature Reviews Materials,* 2020, 5, 501-516.

72. M. Hong and E. Y. X. Chen, *Green Chemistry,* 2017, 19, 3692-3706.

73. K. S. Williams, in *Waste as a Resource,* The Royal Society of Chemistry, 2013, DOI: 10.1039/9781849737883-00083, pp. 83-109.

74. A. E. Krauklis and A. T. Echtermeyer, *Polymers,* 2018, 10, 1017.

75. A. N. Siyal, S. Q. Memon and M. Y. Khuhawar, *Polish Journal of Chemical Technology,* 2013, 14, 11-18.

76. H. Weber, I. De Grave and E. Röhrl, in *Ullmann's Encyclopedia of Industrial Chemistry,* DOI: https://doi.org/10.1002/14356007.a11_435.

77. Z. Z. Ismail, A. J. Jaeel, A. M. Alwared and A. Závodská, *Innovative Infrastructure Solutions,* 2021, 6, 110.

78. Y. Lei and Q. Wu, *Journal of Applied Polymer Science,* 2011, 122, 964-972.

79. U.S. Pat. No. 7,980,494B2, 2010.

All publications, patents and patent applications mentioned in this Specification are indicative of the level of skill of those skilled in the art to which this invention pertains and are herein incorporated by reference to the same extent as if each individual publication, patent, or patent application was specifically and individually indicated to be incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims. The scope of the claims should not be limited to the preferred embodiments set for the description, but should be given the broadest interpretation consistent with the description as a whole.

The invention claimed is:

1. A system for forming an anionic switchable hydrophilicity solvent comprising:

a carboxylic acid comprising a neutral form and an anionic form, wherein the carboxylic acid is a water-immiscible liquid in its neutral form, and is water-soluble in its anionic form, at one or more selected temperatures within a selected temperature range, and/or wherein the carboxylic acid is a liquid that is immiscible with water in its neutral form under an elevated pressure of $CO_2$, and is water-soluble in its anionic form, at one or more selected temperatures within a selected temperature range:

a water-soluble base, wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof;

water; and a source of $CO_2$;

wherein the carboxylic acid, the water-soluble base, and the water are combinable at one of the one or more selected temperatures such that the water-soluble base deprotonates the carboxylic acid and converts the carboxylic acid to its anionic water-soluble form, forming an aqueous solution; and contacting the aqueous solution with $CO_2$ at one of the one or more selected temperatures results in the anionic form of the carboxylic acid being protonated and a biphasic mixture being formed, the biphasic mixture comprising:

an aqueous phase comprising water and the water-soluble base, and an organic phase comprising the carboxylic acid in its neutral form;

45 wherein when the water-soluble base is an amine, the ratio of the water-soluble base to the carboxylic acid is substoichiometric.

2. The system of claim 1, further comprising means for removing $CO_2$ from the biphasic mixture, wherein when $CO_2$ is removed from the biphasic mixture the carboxylic acid is deprotonated and converts to its anionic water-soluble form, re-forming the aqueous solution.

3. The system of claim 2, wherein the means for removing $CO_2$ comprises (i) heat, (ii) a non-acidic gas, (iii) a vacuum or partial vacuum, (iv) agitation, (v) steam, (vi) a membrane, or (vii) any combination thereof.

4. The system of claim 1, further comprising one or more of the following characteristics;
   (i) the water-soluble base has a $pK_{aH}$ equal to or greater than the pKa of the carboxylic acid;
   (ii) the water-soluble base has a $pK_{aH}$ equal to or greater than the pKa of the carboxylic acid, and the water-soluble base has a $pK_{aH}$ of greater than about 4; and
   (iii) the water-soluble base has a $pK_{aH}$ equal to or greater than the pKa of the carboxylic acid, and the water-soluble base has a $pK_{aH}$ of greater than about 5.

5. The system of claim 4, wherein the water-soluble base is a primary, secondary, or tertiary amine.

6. The system of claim 5, wherein the water-soluble base is a tertiary amine comprising at least one hydroxyl substituent.

7. The system of claim 4, wherein the water-soluble base is a basic salt containing a metal cation.

8. The system of claim 7, wherein a stoichiometric ratio of the basic salt containing the metal cation to the carboxylic acid is from about 0.3:1 to about 1:1 or from about 0.4:1 to about 0.9:1 and/or wherein a mass ratio of water to the carboxylic acid is from about 0.5:1 to about 9.5:1 or from about 1:1 to about 4:1.

9. The system of claim 1, wherein the carboxylic acid comprises one or more compounds of the formula $RCO_2H$, wherein R is a substituted or unsubstituted $C_6$ to $C_{11}$ alkyl group that is linear, branched, or cyclic, a substituted or unsubstituted $C_6$ to Cu alkenyl group that is linear, branched, or cyclic, or a substituted or unsubstituted $C_6$ to $C_{11}$ poly-unsaturated group that is linear, branched, or cyclic.

10. The system of claim 9, wherein the carboxylic acid comprises one or more compounds of the formula $RCO_2H$, wherein R is a substituted or unsubstituted $C_6$ to $C_{11}$ alkyl group that is branched or cyclic, a substituted or unsubstituted $C_6$ to $C_{11}$ alkenyl group that is branched or cyclic, or a substituted or unsubstituted $C_6$ to $C_{11}$ polyunsaturated group that is branched or cyclic.

11. The system of claim 1, wherein the carboxylic acid is not a surfactant in its anionic form.

12. The system of claim 1, wherein the neutral form of the carboxylic acid has a log $K_{ow}$ in a range of from about 1 to about 6.

13. The system of claim 1, wherein the aqueous solution is contacted with $CO_2$ at a pressure of from about 0.4 bar to about 50 bar.

14. The system of claim 1, wherein the elevated pressure of $CO_2$ is up to about 50 bar.

15. The system of claim 1, wherein the selected temperature range is of from about 1° C. to about 50° C.

16. An anionic SHS composition comprising:
   a carboxylic acid comprising a neutral form and an anionic form,
   wherein the carboxylic acid is a water-immiscible liquid in its neutral form, and is water-soluble in its anionic form, at one or more selected temperatures within a selected temperature range, and/or wherein the carboxylic acid is a liquid that is immiscible with water in its neutral form under an elevated pressure of $CO_2$, and is water-soluble in its anionic form, at one or more selected temperatures within a selected temperature range;
   a water-soluble base, wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof;
   water; and
   dissolved $CO_2$;
   wherein when a temperature of the composition is one of the one or more selected temperatures, and when an amount of the dissolved $CO_2$ is sufficient to maintain the carboxylic acid in its neutral form, the carboxylic acid is reversibly convertible from:
   (a) its anionic water-soluble form, wherein the anionic water-soluble form of the carboxylic acid forms an aqueous solution with the water-soluble base and the water, to
   (b) its water-immiscible neutral form, wherein the water-immiscible neutral form of the carboxylic acid forms a biphasic mixture with the water-soluble base and the water comprising: an aqueous phase comprising water and the water-soluble base, and an organic phase comprising the carboxylic acid in its neutral form;
   wherein when the water-soluble base is an amine, the ratio of the water-soluble base to the carboxylic acid is substoichiometric.

17. A method of forming an anionic switchable hydrophilicity solvent comprising:
   (a) obtaining a carboxylic acid comprising a neutral form and an anionic form, wherein the carboxylic acid is a water-immiscible liquid in its neutral form, and is water-soluble in its anionic form, at one or more selected temperatures within a selected temperature range, and/or wherein the carboxylic acid is a liquid that is immiscible with water in its neutral form under an elevated pressure of $CO_2$ and is water-soluble in its anionic form, at one or more selected temperatures within a selected temperature range;
   (b) obtaining a water-soluble base, wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof;
   (c) (i) combining in any order:
   the carboxylic acid;
   the water soluble base;
   and water;
   wherein the water-soluble base is configured to deprotonates the carboxylic acid and convert the carboxylic acid to its anionic water-soluble form to form an aqueous solution, wherein a temperature of the aqueous solution is one of the one or more selected temperatures within the selected temperature range;
   wherein when the water soluble base is an amine, the ratio of the water-soluble base to the carboxylic acid is substoichiometric; or (c) (ii) combining:

a salt of the carboxylic acid and the water-soluble base and water to form an aqueous solution, wherein a temperature of the aqueous solution is one of the one or more selected temperatures within the selected temperature range;

wherein when the water-soluble base is an amine, the ratio of the water-soluble base to the carboxylic acid is substoichiometric; and (d) contacting the aqueous solution with $CO_2$ to protonate the anionic form of the carboxylic acid to form a biphasic mixture, wherein a temperature of the biphasic mixture is one of the one or more selected temperatures within the selected temperature range, the biphasic mixture comprising:

an aqueous phase comprising water and the water-soluble base, and an organic phase comprising the carboxylic acid in its neutral form; and (e) optionally, removing $CO_2$ from the biphasic mixture, wherein when $CO_2$ is removed from the biphasic mixture the carboxylic acid is deprotonated and converts to its anionic water-soluble form, re-forming the aqueous solution.

18. A method for separating a selected substance from a mixture using an anionic switchable hydrophilicity solvent, comprising:

(a) obtaining a carboxylic acid comprising a neutral form and an anionic form, wherein the carboxylic acid is a water-immiscible liquid in its neutral form, and is water-soluble in its anionic form, at one or more selected temperatures within a selected temperature range, and/or wherein the carboxylic acid is a liquid that is immiscible with water in its neutral form under an elevated pressure of $CO_2$, and is water-soluble in its anionic form, at one or more selected temperatures within a selected temperature range;

(b) obtaining a water-soluble base, wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof, (c) adding the carboxylic acid in its neutral form to a mixture comprising a selected substance that is water-immiscible or water-insoluble;

(d) allowing the carboxylic acid to solubilize the selected substance to form a second mixture;

(e) optionally isolating insoluble material from the second mixture;

(f) contacting the second mixture with water and the water-soluble base, wherein the water-soluble base deprotonates the carboxylic acid and converts the carboxylic acid to its anionic water-soluble form to form a two-phase mixture having:

a first hydrophobic phase comprising the selected substance, and a second aqueous phase comprising the carboxylic acid in its anionic water-soluble form, wherein a temperature of the two-phase mixture is one of the one or more selected temperatures within the selected temperature range, wherein when the water-soluble base is an amine, the ratio of the water-soluble base to the carboxylic acid is substoichiometric; and (g) separating the first hydrophobic phase from the second aqueous phase; and (h) optionally, contacting the second aqueous phase with CO: to protonate the anionic form of the carboxylic acid to form a biphasic mixture, wherein a temperature of the biphasic mixture is one of the one or more selected temperatures within the selected temperature range, the biphasic mixture comprising:

an aqueous phase comprising water and the water-soluble base, and an organic phase comprising the carboxylic acid in its neutral form; and (i) optionally, separating the organic phase from the aqueous phase to recover the carboxylic acid;

wherein the selected substance is not reactive with the carboxylic acid, the water-soluble base, or a combination thereof.

19. A method of removing gas from polymeric foam using an anionic switchable hydrophilicity solvent, comprising:

(a) obtaining a carboxylic acid comprising a neutral form and an anionic form, wherein the carboxylic acid is a water-immiscible liquid in its neutral form, and is water-soluble in its anionic form, at one or more selected temperatures within a selected temperature range, and/or wherein the carboxylic acid is a liquid that is immiscible with water in its neutral form under an elevated pressure of $CO_2$ and is water-soluble in its anionic form, at one or more selected temperatures within a selected temperature range;

(b) obtaining a water-soluble base, wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof;

(c) contacting a polymeric foam with the carboxylic acid in its neutral form;

(d) allowing the carboxylic acid to solubilize the polymeric foam to form a solution;

(e) contacting the solution of (d) with water and the water-soluble base, optionally, wherein the solution of (d) is first contacted with water and then a resulting combination of the solution of (d) and water is subsequently contacted with the water-soluble base, wherein the water-soluble base deprotonates the carboxylic acid and converts the carboxylic acid to its anionic water-soluble form to form a two-phase mixture having:

a first solid phase comprising the polymer, and a second aqueous phase comprising the carboxylic acid in its anionic water-soluble form, wherein a temperature of the two-phase mixture is one of the one or more selected temperatures within the selected temperature range, wherein when the water-soluble base is an amine, the ratio of the water-soluble base to the carboxylic acid is substoichiometric; and (f) separating the first solid phase from the second aqueous phase; and (g) optionally, contacting the second aqueous phase with $CO_2$ to protonate the anionic form of the carboxylic acid to form a biphasic mixture, wherein a temperature of the biphasic mixture is one of the one or more selected temperatures within the selected temperature range, the biphasic mixture comprising:

an aqueous phase comprising water and the water-soluble base, and an organic phase comprising the carboxylic acid in its neutral form; and (h) optionally, separating the organic phase from the aqueous phase to recover the carboxylic acid.

20. A method of extracting a hydrophobic material from a solid that is at least partially coated by the hydrophobic material using an anionic switchable hydrophilicity solvent, comprising:

(a) obtaining a carboxylic acid comprising a neutral form and an anionic form, wherein the carboxylic acid is a water-immiscible liquid in its neutral form, and is water-soluble in its anionic form, at one or more selected temperatures within a selected temperature range, and/or wherein the carboxylic acid is a liquid that is immiscible with water in its neutral form under an elevated pressure of $CO_2$, and is water-soluble in its anionic form, at one or more selected temperatures within a selected temperature range;

(b) obtaining a water-soluble base, wherein the water-soluble base is an amine, a basic salt containing a metal cation, a basic salt containing a quaternary ammonium cation, a basic salt containing a substituted or unsubstituted ammonium cation, a basic salt containing a quaternary phosphonium cation, a basic salt containing a substituted or unsubstituted phosphonium cation, ammonia, or a mixture thereof;

(c) combining the solid that is at least partially coated by a hydrophobic material with the carboxylic acid in its neutral form to form a mixture of the solid in a homogeneous single-phase liquid, said single-phase liquid comprising the carboxylic acid in its neutral form and the hydrophobic material;

(d) separating the solid from the single-phase liquid;

(e) contacting the single-phase liquid with water and the water-soluble base, wherein the water-soluble base deprotonates the carboxylic acid and converts the carboxylic acid to its anionic water-soluble form to form a two-phase mixture having:

a first hydrophobic phase comprising the hydrophobic material, and a second aqueous phase comprising the carboxylic acid in its anionic water-soluble form, wherein a temperature of the two-phase mixture is one of the one or more selected temperatures within the selected temperature range, wherein when the water-soluble base is an amine, the ratio of the water-soluble base to the carboxylic acid is substoichiometric; and (f) separating the first hydrophobic phase from the second aqueous phase; and (g) optionally, contacting the second aqueous phase with $CO_2$ to protonate the anionic form of the carboxylic acid to form a biphasic mixture, wherein a temperature of the biphasic mixture is one of the one or more selected temperatures within the selected temperature range, the biphasic mixture comprising:

an aqueous phase comprising water and the water-soluble base, and an organic phase comprising the carboxylic acid in its neutral form; and (h) optionally, separating the organic phase from the aqueous phase to recover the carboxylic acid;

wherein the hydrophobic material is not reactive with the carboxylic acid, the water-soluble base, or a combination thereof.

* * * * *